US008840098B2

(12) United States Patent
Douglas

(10) Patent No.: US 8,840,098 B2
(45) Date of Patent: Sep. 23, 2014

(54) PORTABLE WORKPIECE STOPPING DEVICE INCLUDING DETAILED METHOD OF USE

(76) Inventor: Brian Douglas, South Windsor, CT (US)

( * ) Notice: Subject to any disclaimer, the term of this patent is extended or adjusted under 35 U.S.C. 154(b) by 279 days.

(21) Appl. No.: 13/564,816

(22) Filed: Aug. 2, 2012

(65) Prior Publication Data

US 2013/0032985 A1 Feb. 7, 2013

Related U.S. Application Data

(60) Provisional application No. 61/515,072, filed on Aug. 4, 2011, provisional application No. 61/539,393, filed on Sep. 26, 2011.

(51) Int. Cl.
*B23Q 3/00* (2006.01)
*B25H 1/10* (2006.01)

(52) U.S. Cl.
CPC .......................................... *B25H 1/10* (2013.01)
USPC ............................................ 269/315; 269/310

(58) Field of Classification Search
CPC ........ B27B 27/02; B27B 27/04; B27B 27/10; B23D 59/001; B23Q 16/006; B23Q 16/001
USPC ......... 269/315, 309–310, 289 R, 136–138, 3, 269/6, 59
See application file for complete search history.

(56) References Cited

U.S. PATENT DOCUMENTS

| | | | | | |
|---|---|---|---|---|---|
| 5,443,554 | A | * | 8/1995 | Robert | 83/468.7 |
| 6,158,086 | A | * | 12/2000 | De Souza | 16/247 |
| 7,464,737 | B2 | * | 12/2008 | Duginske | 144/253.1 |
| D693,200 | S | * | 11/2013 | Saunders | D8/71 |
| 2011/0084435 | A1 | * | 4/2011 | Furlow | 269/315 |
| 2013/0032985 | A1 | * | 2/2013 | Douglas | 269/315 |

* cited by examiner

*Primary Examiner* — Lee D Wilson
*Assistant Examiner* — Brian Keller

(57) ABSTRACT

A portable workpiece stopping device, attachable to a work surface relative to a primary tool, permitting a repetitive same-length operation to be performed on any number of workpieces, and which allows for interruption of the operation without affecting the essential positioning of the stopping device relative to the primary tool. The stopping device comprises a base plate selectively attachable to a work surface, a rotation plate rotatably coupled to the base plate, an alignment plate adjustably coupled to the rotation plate, a stop plate fixedly coupled to the alignment plate, and a support shelf adjustably coupled to the stop plate. The stopping device can be selectively transitioned from an obstructing position, which blocks the end of a workpiece pressed against the stop plate, thereby allowing the repetitive same-length operation to be performed, to a non-obstructing position which provides for unfettered positioning of any workpiece relative to the primary tool.

20 Claims, 10 Drawing Sheets

PORTABLE WORKPIECE STOPPING DEVICE INCLUDING DETAILED METHOD OF USE

CROSS-REFERENCES TO RELATED APPLICATIONS

This application claims the benefit of priority of the following applications: U.S. Provisional Patent Application No. 61/515,072 filed Aug. 4, 2011, and U.S. Provisional Patent Application No. 61/539,393 filed Sep. 26, 2011. The contents of both applications are incorporated herein, in their entirety, for all purposes.

TECHNICAL FIELD OF THE INVENTION

The invention disclosed herein relates to the use of stopping devices in the technical field of construction. More specifically, to the use of portable workpiece stopping devices in the technical field of construction wherein project locations are inconstant. More specifically, to the application and method of use of portable workpiece stopping devices in the technical field of construction wherein project locations are inconstant and often occur outdoors. More specifically, to the application and detailed use of a portable workpiece stopping device attachable to a work surface, relative to a primary tool, which permits a repetitive same-length operation to be performed on any number of workpieces, and which can be selectively transitioned from an obstructing position, thereby blocking the end of a workpiece pressed against it, to a non-obstructing position, without affecting the essential positioning of the stopping device and which provides unfettered positioning of any workpiece relative to the primary tool.

BACKGROUND ART

Workpiece stopping devices are tools, collectively referred to as "stops", and have been used in a variety of industries for many decades in order to readily repeat, on any number of workpieces, a prescribed length-related operation, such as cutting or drilling. More specifically, in a typical operation, one end of a workpiece is abutted or pressed against a workpiece stopping device in order that an operation being performed at the other end can be repeated with consistency and accuracy any number of times to accommodate a given quantity demand.

Workpiece stopping devices are commonly found in a variety of work shops where same-length cutting, drilling, machining, stamping, hammering, etching, engraving, bending, welding, grinding, scoring, riveting, marking, flaring, notching, printing, scanning, etc., operations occur. It is important to appreciate that these operations, with rare exception, occur in an indoor shop environment. As a result, three conditions pertain to these workpiece stopping devices:

1) the workpiece stopping device equipment is stationary or semi-stationary, that is, it might be moveable if outfitted with wheels, but generally resides in one location since, by requirement, may be very long and cumbersome to move about;
2) the workpiece stopping device equipment is configured as a track system which allows for quick and easy length adjustments along the full length of the track and can be as long as needed to accommodate a given requirement. (Such a piece of equipment can be found at www.flipstop.com.)
3) the workpiece stopping device equipment is not designed to get wet or otherwise be subject to varied weather-related considerations (e.g., temperature, humidity, UV light, wind, etc.).

In the construction industry in particular however, work is generally not performed in a work shop. Most construction work is performed in the field where the particular structure is being built and where most equipment is transported to on trucks driven by the workers. As a consequence, a workpiece stopping device that works in a shop does not, for all intents and purposes, work in the field. Portability is a key and mandatory component of all field related equipment. Portable, generally speaking, means: small/compact, light weight, easy to lift, easy to carry, easy to move, easy to store, easy to assemble/disassemble, etc. Workpiece stopping devices found in a shop environment simply do not meet these requisite field demands.

There are many facets to a construction project and a common, albeit occasional, activity that is required when building virtually any structure of interest, such as a commercial building, an apartment building, a house, or a deck, is to cut any number of workpieces to a single prescribed length—which are then installed by the workers; typical application include: studs that make up a wall, treads required in a staircase assembly, and balusters as an aesthetic and safety component to a railing system. Accordingly, in order to avoid measuring each workpiece individually, creating potential variability and consuming an inordinate amount of time, repetitive same-length cutting operations require setup of a workpiece stopping device.

When a project begins, workers arrive at the job site with their equipment on their vehicles, typically setup one shared work station—because of the substantial space requirements of the construction materials and tool requirements of all the workers—and proceed to distribute the various tasks among themselves. A typical work station includes a compound miter saw as the primary tool for all workers to use in order to cut the variety of stock-sized workpieces (e.g. 2×2, 2×6, 5/4×6, etc.) to the desired lengths and angular end-cut criteria needed. Of course, sharing the work station can lead to conflicts and inefficiencies, such as when a repetitive same-length cutting operation demands that the work station be dedicated, for a limited or extended period of time, to cutting many workpieces to a single prescribed length. To efficiently accomplish this repetitive cutting task the work station is configured so that the specific length to be cut is preset between the primary tool, i.e., the miter saw, and a workpiece stopping device. That is, the workpiece stopping device is located an exact distance, or length, away from the miter saw blade so that each piece pressed or abutted against to the workpiece stopping device is cut to the prescribed length each time. And it is important to appreciate that accuracy and consistency from one workpiece to the next is essential when making repetitive same-length cuts as each piece becomes part of a larger construction assembly and workpiece variability would create disorder within the construction.

It is also helpful, essential, to better understand the work environment. In the field of construction four conditions very commonly exist:

1) workers spend many days, weeks, or months on a given project, then move to another project taking their tools and equipment with them on their work trucks; a circumstance which also requires that workers be able to store their tools securely either in their trucks or on-site during off hours;
2) given the nature of the work, a construction project is physically demanding on tools and equipment and the job site is often outdoors (until a roof is built if the job calls for one) with exposure to a wide variety of weather and sun conditions;

3) construction projects are typically built by two or more workers using a shared work station comprising a compound miter saw as the primary tool;

4) structures are built plumb and square, and constructed with detailed accuracy as a primary goal.

Accordingly, in terms of using a workpiece stopping device in the field of construction, the attributes of the device should consider: a) portability, b) durability, c) interruptibility, and d) accuracy. Taking each consideration in turn:

a) portability considers that virtually all tools and equipment are moved on work trucks with limited space and weight capacities; accordingly, it is preferable that a workpiece stopping device be relatively small/compact, light weight, easy to lift, easy to carry, easy to move, easy to store, easy to assemble/disassemble, etc.;

b) durability considers that construction tools need to withstand the rigors of outdoor use on a construction site; accordingly, a workpiece stopping device would be made of materials that are preferably strong and able to withstand the effects of sun (particularly UV) and weather;

c) interruptibility allows for use of a work station by more than one worker even after the workpiece stopping device has been located, arranged, and adjusted to meet specific length and abutment-end criteria; accordingly, it is preferable that a workpiece stopping device have the capability to be arranged in a specific obstructing configuration by a first worker, easily reconfigured into a non-obstructing position for the needs of a second worker, and be easily re-set back to the original configuration so that the first worker can quickly resume work;

d) accuracy is a desideratum in construction as it allows the various components to be assembled with greatest efficiency; accordingly it is preferable that a workpiece stopping device be true, precise, and substantial, while accommodating setup, adjustment, and transition requirements quickly and easily.

An additional important concept with regard to the background art is to understand a tool's relative level of indispensability. That is, it's usefulness versus it's frequency of use, or the consideration of how well a tool does it's job relative to how often the tool is needed. Fundamentally, the objective of any tool (within or outside the field of construction) is to meet two goals:

1) make the work go faster;

2) do the work more accurately.

These combined attributes influence the tool's usefulness. Usefulness then, combined with frequency of use, determines a tool's level of indispensability. Every tool achieves or fails to meet these criteria to one degree or another, from one user to another. By in large, the vast majority of construction tools are used infrequently. None-the-less many are considered indispensable. Most field tools do not fall into the high frequency use category such as a measuring tape, a hammer, or a circular saw, tools that are used many times a day on a typical project. Most tools fall into the infrequent use category such as a router, a reciprocating saw, or a laser level, tools that are generally used only occasionally, even rarely, but when needed, produce results that are exceptionally quick and exceptionally accurate, and accordingly achieve a high level of indispensability, i.e., must-own tools.

Referring now to FIG. 1, work station 20 is shown comprising miter saw 21 as the primary tool. Miter saw 21 rests on a conventional work surface 26 comprised of top planks supported by saw horses. It is preferable that work surface 26 be level, although not mandatory. Miter saw 21 includes a blade 22 and a cutting platform 24. Blade 22 contains cutting teeth which further defines cutting plane 23 on the side of blade 22. The relevant cutting plane 23 is on the side of blade 22 which is nearest temporary stop 30 (described below). Additionally, one or more rollers or other support structures 27 may be placed on work surface 26 and arranged at a height equal to cutting platform 24 of miter saw 21 to define resting plane 25 across the length of work surface 26. During a cutting operation a workpiece 10 (e.g., a 2×4) is positioned on resting plane 25 (i.e., on cutting platform 24 and extending outwardly left and right therefrom) and cut to a prescribed length L by activation of blade 22 of miter saw 21 wherein the blade is vertically lowered into workpiece 10 to make the cut. To accurately repeat the cut at length L a temporary stop 30 is secured to work surface 26 at the prescribed distance, or length L, away from cutting plane 23 of miter saw 21. Length L is measured from cutting plane 23 to a stop surface 31 of temporary stop 30. Upon establishing length L, temporary stop 30 is secured to work surface 26 with clamps, screws, or the like. This configuration now allows for any number of workpieces 10 to be cut to length L without the need to measure each workpiece 10. It should also be appreciated that the pieces arranged to produce temporary stop 30 must be stacked to a height above resting plane 25 such that temporary stop 30 can consistently block, obstruct, or otherwise stop a workpiece abutted against stop surface 31. Additionally, in this typical arrangement of such a work station, temporary workpiece stopping devices are generally constructed of scrap materials that are usually available during project construction.

A problem with respect to the characteristics of work station 20 is that after temporary stop 30 is secured in place other workers sharing the work station 20 are generally unable to use the miter saw 21 because the temporary stop 30 creates an obstruction whenever a workpiece 10 needs to be cut longer than the stop position, length L. As a result, other workers on the job have limited options in terms of maintaining productivity. Available options include:

1) waiting until the repetitive same-length cutting operation is complete;

2) dedicating the space and setting up a separate work station to do independent cutting;

3) making the cut(s) with a less precise and less versatile hand-held circular saw;

4) disassembling temporary stop 30 and reassembling it whenever an interrupting cut must be made.

As can be appreciated, the four options are each fraught with unproductive and undesirable consequences.

Another problem with respect to the characteristics of work station 20 and temporary stop 30 is that there is no provision to support the abutment-end of workpiece 10 (i.e., the end of workpiece 10 away from miter saw 21 and abutting stop surface 31). As described above, resting plane 25 extends outwardly from cutting platform 24 of miter saw 21 and is coplanar with the top of support structures 27. If the material being cut, with its inherent structural limitations, extends too far beyond cutting platform 24 or too far beyond a support structure 27 before contacting stop surface 31, an excess cantilever will result causing the workpiece to bend, deflect, or otherwise sag downward from resting plane 25. This condition will invariably lead to cuts that are either too long or too short relative to the desired length.

Another problem with respect to the characteristics of work station 20 is that temporary stop 30 is inherently awkward and time-consuming to setup and adjust. The top portion of temporary stop 30 must always be higher than resting plane 25. This usually requires that temporary stop 30 be made in two or more pieces and are therefore subject to independent movement. This can then affect the ability of temporary stop 30 to maintain a fixed position. Further, because the materials are generally made from scrap, set-up requirements always vary. Accordingly, pieces comprised of the correct length, width, and thickness for a particular set-up may not be available. For example, if the project is in the earliest stages of construction or if a site cleanup was recently performed the appropriate materials may not be available; requiring that stop pieces be cut from new material, thereby creating undesirable waste. All of these factors contribute to setup difficulties, diminished reliability, and reduced productivity when working with temporary stop 30.

Referring now to FIG. 2, work station 40 is shown comprising miter saw 41 as the primary tool. Miter saw 41 connects to a portable miter saw stand 46 comprising extension arms 47 and a support/stop member, shown generally at 50. Similar to the previously described arrangement, miter saw 41 includes a blade 42, a cutting plane 43, a cutting platform 44, and a resting plane 45 which is defined by cutting platform 44 and extending outwardly left and right therefrom. It is preferable that resting plane 45 be level, although not mandatory. Adjustable length extension arms 47 extend outwardly, within limits, from each end of saw stand 46. If a heavy workpiece is being cut it is possible to insert a vertical support under extension arm 47, such as adjustable support post 48, an inverted “T”, to carry the overload. Mounted near the end of extension arm 47 is support/stop member 50 comprised of a short vertical post 51 to which is connected a support surface 52 the top of which is coplanar with resting plane 45. Attached to support surface 52 is a stopping mechanism 53 which is configured to provide a stop surface 54 when making repetitive same-length cuts and which can rotate out of the way when not in use. (Such a piece of equipment can be found at www.dewalt.com, search DWX723.)

A problem with respect to the characteristics of work station 40 is that support/stop member 50 is unreliable. Vertical post 51 is attached to extension arm 47 by means of a hand-tightened solitary center thumb knob and bolt—this configuration is prone to rotation and wobble. Additionally, vertical post 51 is fabricated in a telescoping fashion using hand-tightened thumb knobs in a dual-slotted arrangement to accommodate the variety of cutting platform 44 heights that exist on the variety of miter saws available on the market at the time of this writing—the resulting assembly is problematic to set up and easily disrupted—i.e., unreliable.

Another problem with respect to the characteristics of work station 40 is that miter saw stands, given the requirements of portability, demand that the stands be made of relatively thin-walled, light-weight materials, e.g., aluminum. As a consequence, as extension arm 47 is extended or lengthened, it becomes less and less supportive, i.e. as cantilevers lengthen they become progressively less able to support a load, resulting in a structure that is decreasingly sturdy, more unstable, less able to produce consistent same-length cuts—i.e., also unreliable. While use of support post 48 under extension arm 47 can help with sag caused by heavier/longer workpieces, it does not prevent a back-and-forth swaying action that can occur as workpieces become heavier/longer—regardless of the attempt to counter such movement with the inverted “T” provision—i.e., further unreliable.

Another problem with respect to the characteristics of work station 40 is that use of support/stop member 50 is restricted to the two length extremes of extension arm 47. That is, if repetitive cuts are required to be longer or shorter than the available extremes of extension arm 47, the support/stop member 50 is unavailable, thus diminishing the versatility of work station 40.

Another problem with respect to the characteristics of work station 40 is that it is extremely difficult to produce fine length adjustments of stop surface 54 of support/stop member 50 relative to miter saw 41. The only way to make length adjustments is to slide extension arm 47 in-and-out of saw stand 46; an awkward adjustment method particularly as the unit get older and dirt and sawdust enter the extension arm guide channels. Also, there is no provision to angle the stop surface 54, relative to the longitudinal orientation of workpiece 10, when needed to accommodate a particular abutment-end angular condition.

Another problem with respect to the characteristics of work station 40 is that support/stop member 50 cannot be used independently. It cannot be used in other repetitive same-length operations such as when a workpiece stopping device is required for use with a floor model drill press or punch-press. That is, the support/stop member 50 is only workable as part of extension arm 47 and is generally not available otherwise.

Referring now to FIG. 3, work station 60 is shown comprising miter saw 61 as the primary tool. Miter saw 61 rests on a portable work stand 66. A channel track stopping assembly is comprised of one or more of each of the following: channel track 67, support structure 68, and slideable stop member, shown generally at 70. Similar to the previously described arrangements, miter saw 61 includes a blade 62, a cutting plane 63, a cutting platform 64, and a resting plane 65 which is defined by cutting platform 64 and extending outwardly left and right therefrom. In addition to work stand 66 needed to support miter saw 61, at least one section of channel track 67 (two sections of channel track 67 are shown) is attached to at least one side of cutting platform 64 of miter saw 61, the top of which is coplanar with resting plane 65. Aside from the end(s) attached to cutting platform 64, the end of each section of channel track 67 must be carried and stabilized by a support structure 68 (two support structures 68 are shown). Additionally, after the first channel track 67 is attached to cutting platform 64 of miter saw 61, each added section of channel track 67 must comprise a section connector (not shown) in order to attach an additional section to a previous section. Optimally, miter saw 61, work stand 66, channel tracks 67, and support structures 68 are configured to produce a substantially straight and level, contiguous system. Each channel track 67 comprises a slide channel (not shown) contiguous through all track sections, to accommodate the back-and-forth sliding capability of stop member 70. Stop member 70, comprised of stop arm 73 and stop surface 74, is arranged along channel track 67 for use in making repetitive same-length cuts; stop arm 73 and stop surface 74 can be rotated out of the way when not in use. (Such a piece of equipment can be found at www.sawhelper.com, search Ultrafence.)

A problem with respect to the characteristics of work station 60 is that setup of the track system is onerous. Channel tracks 67, by necessity, must be of a limited size to optimize portability, rigidity, and storage requirements (i.e., typically about 1.4 m or 54" long). Setup is substantial and time-consuming as each joint and each section of channel track 67 must be carefully assembled, supported, leveled, and adjusted to a correct height, relative to resting plane 65. One, two, or three sections of channel track 67 may be needed on just one side of miter saw 61 to accomplish a given repetitive same-length cutting operation; but to make the system most useful, the components must be available and the setup process must be undertaken on both sides of miter saw 61—thereby doubling the equipment and effort required to make a complete, substantially straight, and level assembly.

Another problem with respect to the characteristics of work station 60 is that work stand 66 and support structures 68, when used away from a paved level surface, can be difficult to set up particularly if the supporting ground is irregular, uneven, sloping, soft, wet, spongy, or a combination of these conditions; or the condition of the supporting ground may be acceptable one day, but due to changeable weather conditions, could be unacceptable the next day. Generally, paved surfaces to set up equipment are atypical at construction sites and if a paved surface does exist it's usually too far away from the work at hand to be helpful, i.e., generally, the closer the equipment is to the work being performed, the more productive the crew will be.

Another problem with respect to the characteristics of work station 60 is the relative instability and lack of strength throughout the system. The requirements for portability demand that the channel track 67 sections be made of relatively thin-walled, light-weight materials, e.g., aluminum, which subsequently requires relatively frequent support, even in the absence of relatively weak/flexible section connections. The use of frequent support structures 68 helps manage the weight of the construction materials being cut but the entire assembly is relatively fragile and susceptible of being moved out of alignment or being knocked over on a job site. Further, as additional sections of channel track 67 are added, the portions of the track furthest away from the miter saw 61 become inherently less stable and more prone to accidental damage, even wind damage. Additionally, because of the relative fragility of the system, the work station ought to be set up and dismantled each work day; leaving the assembly unattended and exposed to potentially destructive elements (e.g., weather hazards or ill-intentioned visitors) is very risky.

Another problem with respect to the characteristics of work station 60 is the relatively large storage requirements of the several and varied components that can make up a workable system—as well as the consideration that the components are often stored in construction vehicles, which are sometimes remote from a work area. So not only must a considerable amount of space be dedicated to accommodate the size and quantity of the various components, the time consideration to assemble/disassemble and transport the several parts twice a day, from storage to work station and back, is very problematic. Further, it is essential to appreciate that during a typical construction project, repetitive same-length cutting operations, although performed regularly, are required only occasionally, not frequently, and as such make the considerable storage and time requirements of this system unfortunate.

Another problem with respect to the characteristics of work station 60 is that stop member 70 cannot be used independently. It cannot be used in other repetitive same-length operations such as when a workpiece stopping device is required for use with a floor model drill press or punch-press. That is, the stop member 70 is only workable as part of channel track 67 and is generally not available otherwise.

Accordingly, there is need for improvement with respect to stopping devices used at work stations; the portable workpiece stopping device described herein and shown in the various embodiments elucidates many such improvements.

SUMMARY OF THE EMBODIMENTS OF THE INVENTION

According to one aspect of the present invention there is presented a portable workpiece stopping device for mounting on a work surface at a prescribed distance in a longitudinal orientation from a primary tool, the device comprising:

a) a base member having an underside which defines a mounting plane and includes a plurality of fastener openings spaced apart one from the other in a direction of the mounting plane and arranged to receive fasteners therethrough for attaching the base member to the work surface;

b) a stop member defining a stop face thereon;

c) an operating mechanism including an intermediate body supporting the stop member on the base member such that the stop member is movable relative to the base member in a prescribed direction of the operating mechanism between an obstructing position, in which the stop face of the stop member is oriented perpendicular to said longitudinal orientation and is arranged to be positioned for engagement with an end of a workpiece, and a non-obstructing position in which access of the workpiece to the primary tool is substantially unobstructed by the stop member;

d) the operating mechanism including an action stop which prevents movement of the stop member relative to the base member beyond the obstructing position in the prescribed direction from the non-obstructing position to the obstructing position;

e) an adjustment mechanism coupling the intermediate body of the operating mechanism to one of the base member or the stop member;

f) the adjustment mechanism including a clamping member operable between a moveable position in which relative adjustment in a horizontal plane is permitted between the intermediate body of the operating mechanism and said one of the base member or the stop member and a clamped position in which the intermediate body is fixed to said one of the base member or the stop member;

g) the operating mechanism being operable to displace the stop member from the obstructing position to the non-obstructing position in the clamped position of the adjustment mechanism; and h) a support shelf defining an upper supporting surface arranged to support a workpiece thereon, the support shelf being configured relative to the base member for upward/downward sliding movement so as to be heightwise adjustable relative to the base member when in the obstructing position.

One embodiment of the invention is directed to a portable workpiece stopping device for use at a work station, in specific relationship to a primary tool, and which comprises a base plate, a hinge plate, an alignment plate, a stop plate, and a support shelf. The base plate, attachable to a work surface at the work station comprises a first hinge portion and coupling features. The hinge plate comprises a second hinge portion, is rotatably coupled on a horizontal axis to the base plate, and also comprises coupling features. The alignment plate is adjustably coupled to both the hinge plate and the base plate. The stop plate is fixedly coupled to the alignment plate and comprises an elongated slot. The support shelf is adjustably coupled to the slot in the stop plate and comprises a protruding platform to carry an abutment-end of a workpiece pressed against the stop plate. Accordingly, the hinge plate, alignment plate, stop plate, and support shelf, as an assembly, are vertically rotatable, relative to the base plate, from an obstructing position to a non-obstructing position, and vice-versa. Relative to the primary tool at the work station, and to accommodate repetitive same-length workpiece requirements, the portable workpiece stopping device is located, attached, and configured in an obstructing position, wherein the aforementioned assembly nests with, and is fixedly coupled to the base plate. This configuration then allows any number of same-length workpieces to be produced by pressing the abutment-end of each workpiece against the stop plate, while the prescribed operation, such as cutting, occurs at the other end of the workpiece When interrupted during the operation, the portable workpiece stopping device can be easily reconfigured into a non-obstructing position wherein the aforementioned assembly is uncoupled from the base plate and rotated up and away from the base plate, thereby creating an unfettered work zone relative to the primary tool without affecting the essential pre-set positioning of the stop plate. When necessary, the device can be quickly reconfigured back to the original obstructing position for resumption of the repetitive, same-length operation, e.g., a cutting operation.

Another embodiment of the invention resembles in every respect the immediate previously described embodiment except that a quick-change mechanism replaces various coupling features of the base plate and alignment plate. When transitioning from an obstructing position to a non-obstructing position, and vice-versa, the portable workpiece stopping device now comprises a quick-change mechanism which does not require that any components be removed from the assembly and which significantly hastens the transitioning process. Moreover, the method and use of this embodiment is exactly the same as previously described.

An additional embodiment of the invention is directed to a portable workpiece stopping device for use at a work station, in specific relationship to a primary tool, and which involves some significant changes as compared to the previous embodiments but at the same time reflects substantially similar features. Accordingly, this embodiment comprises a base plate, a pivot plate, an alignment plate, a stop plate, and a support shelf. The base plate, attachable to a work surface at the work station comprises a first rotatable coupling component and other coupling features. The pivot plate comprises a second rotatable coupling component, is rotatably coupled on a vertical axis to the base plate, and also comprises coupling features. The alignment plate, is adjustably coupled to both the pivot plate and the base plate. The stop plate is fixedly coupled to the alignment plate and comprises an elongated slot. The support shelf is adjustably coupled to the slot in the stop plate and comprises a protruding platform to carry an abutment-end of a workpiece pressed against the stop plate. Accordingly, the pivot plate, alignment plate, stop plate, and support shelf, as an assembly, are horizontally rotatable, relative to the base plate, from an obstructing position to a non-obstructing position, and vice-versa. Relative to the primary tool at the work station, and to accommodate repetitive same-length workpiece requirements, the portable workpiece stopping device is located, attached, and configured in an obstructing position, wherein the aforementioned assembly nests with, and is fixedly coupled to the base plate. This configuration then allows any number of same-length workpieces to be produced by pressing the abutment-end of each workpiece against the stop plate, while the prescribed operation, such as cutting, occurs at the other end of the workpiece. When interrupted during the operation, the portable workpiece stopping device can be easily reconfigured into a non-obstructing position wherein the aforementioned assembly is uncoupled from the base plate and rotated horizontally, in this embodiment counter-clockwise, away from the base plate, thereby creating an unfettered work zone relative to the primary tool without affecting the essential pre-set positioning of the stop plate. When necessary, the device can be quickly reconfigured back to the original obstructing position for resumption of the repetitive, same-length operation, e.g., a cutting operation.

Another embodiment of the invention is directed to a portable workpiece stopping device for use at a work station, in specific relationship to a primary tool, and which comprises a base plate, slide rails, a slide plate, an alignment plate, a stop plate, and a support shelf. The base plate, attachable to a work surface at the work station comprises mounting studs. The slide rails are affixed to the mounting studs of the base plate and further comprise travel-limiting posts. The slide plate is slideably coupled to the slide rails and comprises travel-limiting notches and coupling features. The alignment plate is adjustably coupled to the slide plate. The stop plate is fixedly coupled to the alignment plate and comprises an elongated slot. The support shelf is adjustably coupled to the slot in the stop plate and comprises a protruding platform to carry an abutment-end of a workpiece pressed against the stop plate. Accordingly, the slide plate, alignment plate, stop plate, and support shelf, as an assembly, are horizontally slideable, relative to the base plate, from a forward obstructing position to a rearward non-obstructing position, and vice-versa. Relative to the primary tool at the work station, and to accommodate repetitive same-length workpiece requirements, the portable workpiece stopping device is located, attached, and configured in an obstructing position, wherein the slide plate is coupled to the forward travel-limiting posts of the slide rails. This configuration then allows any number of same-length workpieces to be produced by pressing the abutment-end of each workpiece against the stop plate, while the prescribed operation, such as cutting, occurs at the other end of the workpiece. When interrupted during the operation, the portable workpiece stopping device can be easily reconfigured into a non-obstructing position wherein the aforementioned assembly is uncoupled from the forward position, slid to the rearward position, and subsequently coupled with the rearward travel-limiting posts of the slide rails, thereby creating an unfettered work zone relative to the primary tool without affecting the essential pre-set positioning of the stop plate. When necessary, the device can be reconfigured back to the original obstructing position for resumption of the repetitive, same-length operation, e.g., a cutting operation.

An additional embodiment of the invention is directed to a portable workpiece stopping device for use at a work station, in specific relationship to a primary tool, and which comprises a base plate, an alignment plate, a stop plate, and a support shelf. The base plate, attachable to a work surface at the work station comprises coupling features. The alignment plate, adjustably coupled to the base plate, comprises axle posts disposed on opposite edges of the alignment plate, which further comprise rotation coupling features and rotation limiting features. The stop plate is rotatably coupled to the alignment plate, between the axle posts, and comprises an elongated slot. The support shelf is adjustably coupled to the slot in the stop plate and comprises a protruding platform to carry an abutment-end of a workpiece pressed against the stop plate. Accordingly, the stop plate and support shelf, as an assembly, are rotatable relative to the alignment plate, from a perpendicular obstructing position to a parallel non-obstructing position, and vice-versa. Relative to the primary tool at the work station, and to accommodate repetitive same-length workpiece requirements, the portable workpiece stopping device is located, attached, and configured in an obstructing position, wherein the stop plate is rotated to a position that is perpendicular to the alignment plate. This configuration then allows any number of same-length workpieces to be produced by pressing the abutment-end of each workpiece against the stop plate, while the prescribed operation, such as cutting, occurs at the other end of the workpiece. When interrupted during the operation, the portable workpiece stopping device can be easily reconfigured into a non-obstructing position wherein the stop plate is simply rotated to a position that is parallel to the alignment plate, thereby creating an unfettered work zone relative to the primary tool without affecting the essential pre-set positioning of the stop plate. When necessary, the device can be quickly reconfigured back to the original obstructing position for resumption of the repetitive, same-length operation, e.g., a cutting operation.

Another embodiment of the invention resembles in every respect the immediate previously described embodiment except that the axle posts and stop plate are modified to comprise intermittently engaging male/female keys and a biasing member. This embodiment allows the stop plate and support shelf assembly to be transitioned from a perpendicular obstructing position to a parallel non-obstructing position, and vice-versa, by means of a temporary/rotational force appropriately applied to the stop plate against the biasing member, thereby allowing the keys to separate only as required to accommodate the transition. Moreover, the method and use of this embodiment is exactly the same as previously described.

An additional embodiment of the invention is directed to a portable workpiece stopping device for use at a work station, in specific relationship to a primary tool, and which comprises a base plate, an alignment plate, a swing plate, a stop plate, and a support shelf. The base plate, attachable to a work surface at a work station comprises coupling features. The alignment plate is adjustably coupled to the base plate. The swing plate is fixedly coupled to the alignment plate and comprises a first rotatable coupling component and a rotation stop. The stop plate comprises a second rotatable coupling component, is rotatably coupled to the swing plate, and also comprises a shelf coupling hole. The support shelf is adjustably coupled to the stop plate and comprises a protruding platform to carry an abutment-end of a workpiece pressed against the stop plate. Accordingly, the stop plate and support shelf, as an assembly, are rotatable, relative to the alignment plate, from a perpendicular obstructing position to a parallel non-obstructing position, and vice-versa. Relative to the primary tool at the work station, and to accommodate repetitive same-length workpiece requirements, the portable workpiece stopping device is located, attached, and configured in an obstructing position, wherein the stop plate is rotated to a position against the rotation stop of the swing plate and perpendicular to the alignment plate. This configuration then allows any number of same-length workpieces to be produced by pressing the abutment-end of each workpiece against the stop plate, while the prescribed operation, such as cutting, occurs at the other end of the workpiece. When interrupted during the operation, the portable workpiece stopping device can be easily reconfigured into a non-obstructing position wherein the stop plate is simply rotated to a position that is parallel to the alignment plate, thereby creating an unfettered work zone relative to the primary tool without affecting the essential pre-set positioning of the stop plate. When necessary, the device can be quickly reconfigured back to the original obstructing position for resumption of the repetitive, same-length operation, e.g., a cutting operation.

DETAILED DESCRIPTION OF THE EMBODIMENTS OF THE INVENTION

The invention relates generally to a portable workpiece stopping device for mounting on a work surface (e.g., in place of temporary stop 30, FIG. 1) at a prescribed distance in a longitudinal orientation (e.g., in the orientation of length L, FIG. 1) from a primary tool. In all embodiments the device includes a base member, an operating mechanism which includes an intermediate body, an adjustment mechanism, a stop member, and a support shelf.

The base member has an underside which defines a mounting plane and includes a plurality of fastener openings spaced apart one from the other in a direction of the mounting plane and arranged to receive fasteners therethrough for attaching the base member to the work surface.

The operating mechanism includes an intermediate body that supports a stop member on the base member such that the stop member is movable relative to the base member in a prescribed direction of the operating mechanism between an obstructing position and a non-obstructing position. The operating mechanism also includes an action stop which prevents movement of the stop member relative to the base member beyond the obstructing position in the prescribed direction from the non-obstructing position to the obstructing position.

The adjustment mechanism couples the intermediate body of the operating mechanism to one of the base member or the stop member. The adjustment mechanism includes a clamping member operable between a moveable position in which relative adjustment in a horizontal plane is permitted between the intermediate body of the operating mechanism and either one of the base member or the stop member, and a clamped position in which the intermediate body is fixed to the respective one of the base member or the stop member. The operating mechanism is operable to displace the stop member from the obstructing position to the non-obstructing position even when the adjustment mechanism is in the clamped position.

The stop member defines a stop face thereon for abutting the end of a workpiece thereagainst. In the obstructing position the stop face of the stop member is oriented perpendicular to the longitudinal orientation (e.g., in the orientation of length L, FIG. 1) relative to the primary tool. In the non-obstructing position access of the workpiece to the primary tool is substantially unobstructed by the stop member.

In all embodiments the portable workpiece stopping device includes a support shelf defining an upper supporting surface arranged to support the workpiece thereon. The support shelf is arranged on the stop member and configured with respect to the base member for an upward/downward sliding movement so as to be heightwise adjustable relative to the base member when in the obstructing position.

Figure 4:
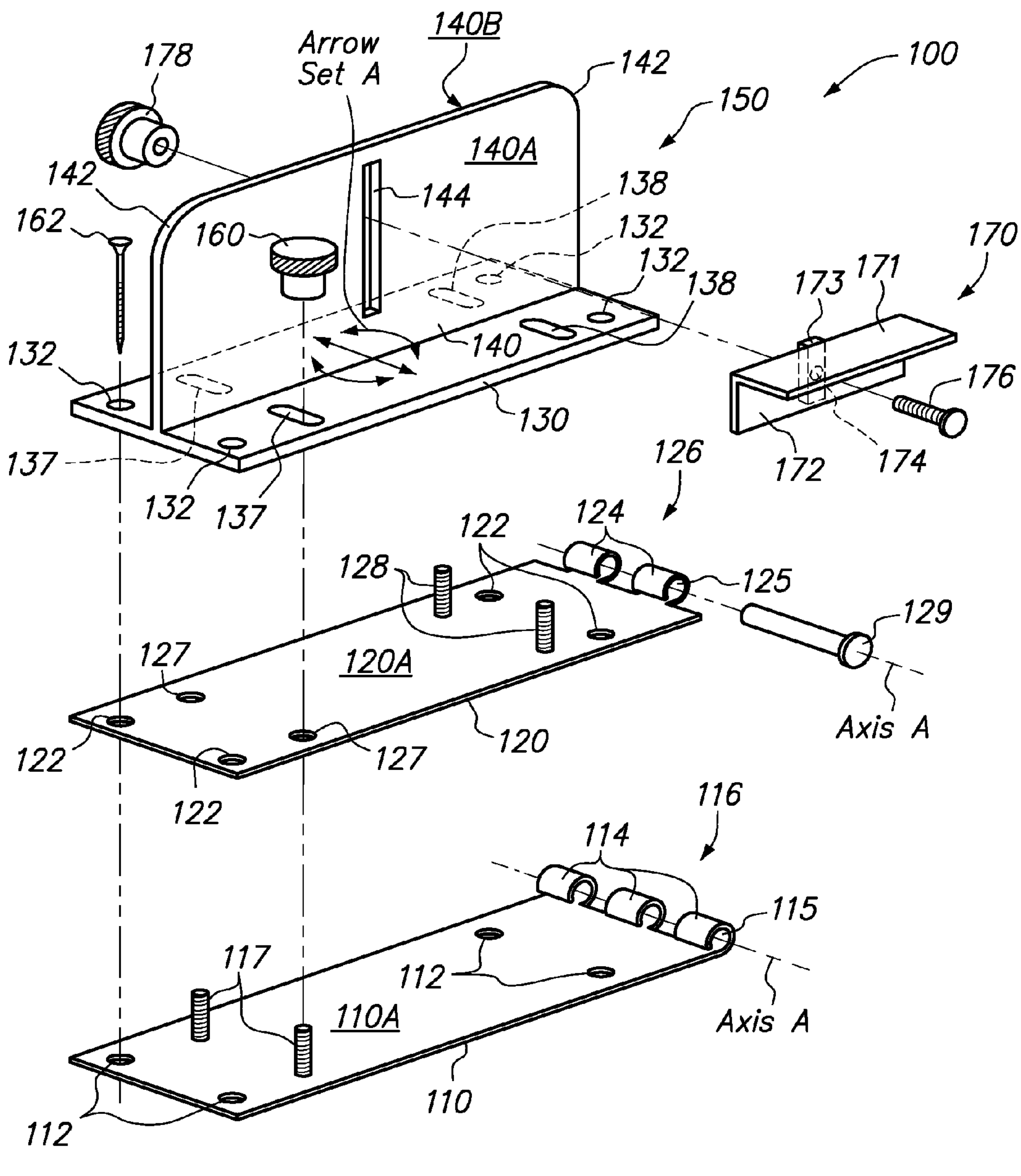
FIG. 4 is an exploded perspective view of one embodiment of a portable workpiece stopping device in accordance with the invention.

Referring now to FIG. 4, an exploded assembly view of the portable workpiece stopping device 100 in accordance with one embodiment of the invention is shown. The primary components being comprised of a base plate 110, a hinge plate 120, a stop member 150 (further comprising an alignment plate 130 and a stop plate 140), and a support shelf, shown generally at 170. Each component is preferably constructed of relatively strong and corrosion resistant materials such as stainless steel. It should be understood however, that the material prescribed is not intended to be limiting in any way, providing each component is of adequate thickness and remains substantially rigid during use. Accordingly, in other embodiments one or more of the components may be fabricated of steel, zinc, aluminum, or any other sufficiently strong material or alloy that is either naturally corrosion resistant or which may be painted, powder coated, anodized, electroplated, chemically or electrically modified, or otherwise treated to improve corrosion resistance; or the components may be fabricated of fiberglass or composite materials, or of a durable plastic, or of materials composed of polymers or resins; the components may also be fabricated from a combination of these materials. Additionally, the components, as appropriate, may be produced from sheet stock, may be die or investment cast, may be injection or form molded, or produced from any other available process, and may be cured by air, heat, light, chemical reaction, or by any other acceptable method.

Figure 1:
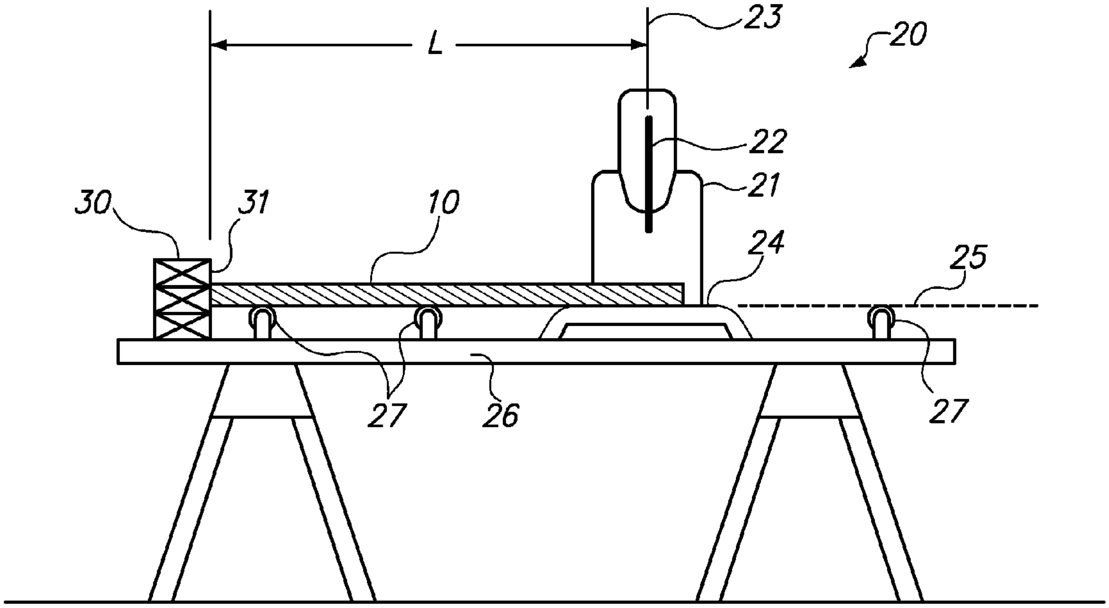
FIG. 1 PRIOR ART
FIG. 1 is a front elevation view of a work station as may be found on a construction site comprising a miter saw as the primary tool resting on conventional work surface planks and supported by saw horses.
Figure 2:
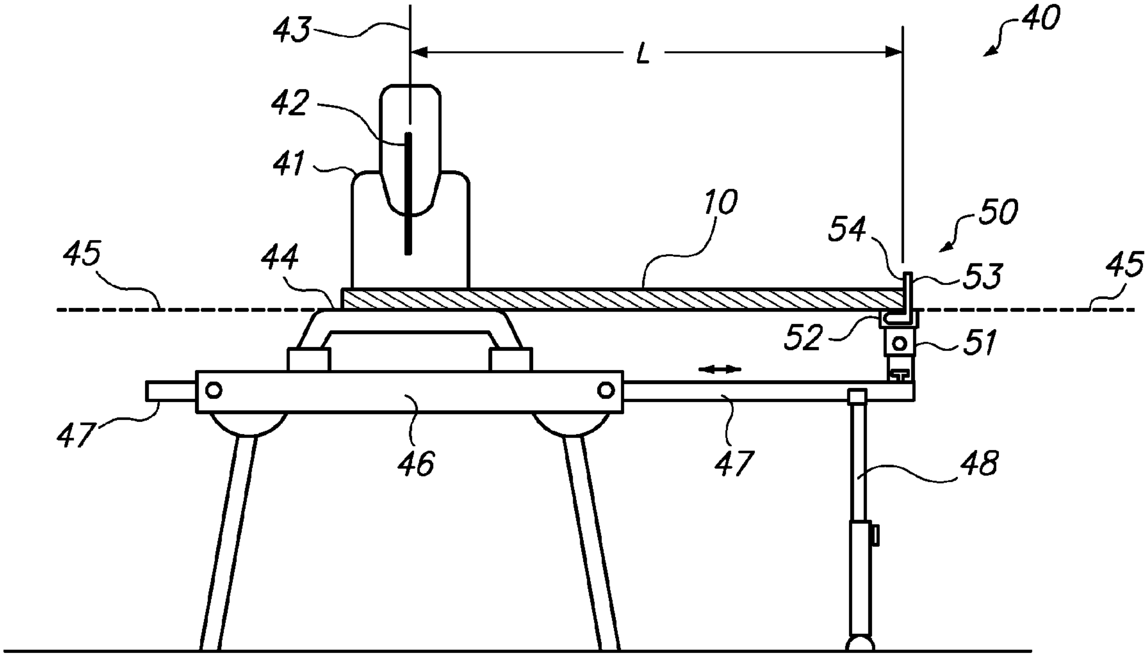
FIG. 2 PRIOR ART
FIG. 2 is a front elevation view of a work station as may be found on a construction site comprising a miter saw as the primary tool attached to a portable miter saw stand with integral extension arms.
Figure 3:
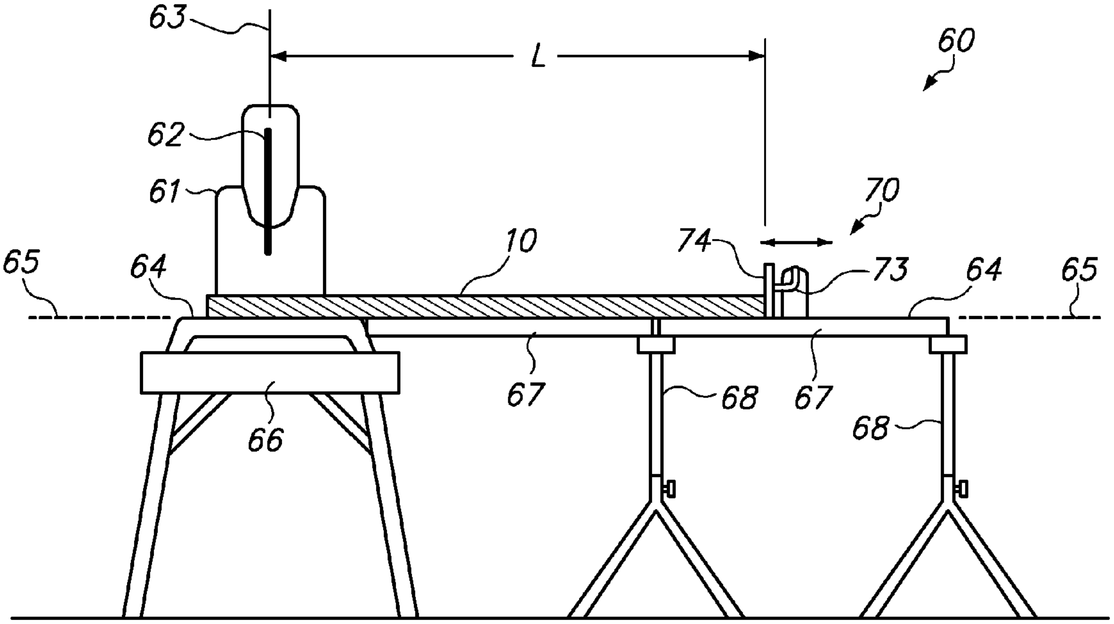
FIG. 3 PRIOR ART
FIG. 3 is a front elevation view of a work station as may be found on a construction site comprising a miter saw as the primary tool resting on a portable saw stand with channel tracks attached that are carried by support structures.

Base plate 110 is elongated between the front and rear portions, substantially rectangular, and extends in a plane substantially parallel to the work surface on which it is mounted (e.g., work surface 26, FIG. 1). The underside of base plate 110 also defines the mounting plane. Base plate 110 further comprises a plurality of fastener openings 112 (four fastener openings 112 are shown) for receiving mounting fasteners 162 (e.g., wood screws, commonly available on construction projects) to attach base plate 110 to the work surface. Fastener openings 112 are generally located near each corner and are sized to allow only the threaded and shaft portions of mounting fasteners 162 to pass through and to not allow the head portion of the fastener to pass through. Additionally, the underside of base plate 110, the mounting plane, engages the work surface when the device 100 is mounted.

A front portion of base plate 110 comprises at least one post or stud 117 (two studs 117 are shown) protruding upwardly from and perpendicular to a top surface 110A and are adapted to receive a fastening device 160 such as a wing nut, thumb knob, clamp, or the like. Studs 117 are of adequate height, protrude through hinge plate 120 and extend proud of alignment plate 130 (both described below). Further, studs 117 are affixed to base plate 110 by, for example, a threading arrangement, a weld, a pressed mechanical bond, an integrating molding process, or by any other acceptable method.

A rear portion of base plate 110 comprises a first hinge portion, shown generally at 116, which may comprise one or more bearings. First hinge portion 116 is defined by an arrangement of two or more elongated rings or hinge knuckles 114 (three hinge knuckles 114 are shown) which create therein a tube or pin channel 115 aligned about Axis A. Further, Axis A is parallel to the mounting plane and parallel to the longitudinal orientation between the device 100 and the primary tool (e.g., in the orientation of length L, FIG. 1). First hinge portion 116 is further adapted to receive a second hinge portion, shown generally at 126, of hinge plate 120 (described below).

Hinge plate 120 is elongated, substantially rectangular, extends in a plane substantially parallel to base plate 110 when disposed in an obstructing position (described below) and has a length and width substantially similar to base plate 110; although in another embodiment hinge plate 120 may have dimensions dissimilar to base plate 110. Hinge plate 120 further comprises a plurality of fastener openings 122 spaced apart in two different directions relative to one another within the mounting plane (four fastener openings 122 are shown) for receiving mounting fasteners 162. Fastener openings 122 are also generally located near each corner of hinge plate 120 and are each concentrically aligned with its respective fastener opening 112 of base plate 110 when configured in an obstructing position (described below). Further, fastener openings 122 are larger in diameter than fastener openings 112 such that the heads of mounting fasteners 162 can pass completely through fastener opening 122 so as not to bind, clamp, or attach hinge plate 120 to base plate 110; rather, once mounting fasteners 162 are installed, hinge plate 120 is completely unencumbered by mounting fasteners 162.

A front portion of hinge plate 120 comprises a plurality of bores or stud holes 127 (two stud holes 127 are shown) that are concentric with, adequately large, and allow studs 117 of base plate 110 to pass through.

A rear portion of hinge plate 120 also comprises at least one post or stud 128 (two studs 128 are shown) protruding upwardly from and perpendicular to a top surface 120A and is adapted to receive a fastening device 160 such as a wing nut, thumb knob, clamp, or the like. Studs 128 are of adequate height and extend proud of alignment plate 130 (described below). Further, studs 128 are affixed to hinge plate 120 by, for example, a threading arrangement, a weld, a pressed mechanical bond, an integrating molding process, or by any other acceptable method.

The rear portion of hinge plate 120 further comprises a second hinge portion, shown generally at 126, which may comprise one or more bearings and is defined by an arrangement of at least one elongated ring or hinge knuckle 124 (two hinge knuckles 124 are shown) which create therein a tube or pin channel 125 also aligned about Axis A. Hinge knuckles 124 are further adapted to engage and align with hinge knuckles 114 of first hinge portion 116 of base plate 110. First hinge portion 116 and second portion hinge 126 are rotatably coupled by meshing the structures together and inserting a solid dowel or hinge pin 129 through both pin channel 115 of base plate 110 and pin channel 125 of hinge plate 120. The resulting coupling allows base plate 110 and hinge plate 120 to each rotate about Axis A. It should also be noted that when base plate 110 is attached and in full contact with a work surface (e.g., work surface 26, FIG. 1) and when hinge plate 120 is situated atop, fully nested, and rotatably coupled with base plate 110, the two plates maintain a parallel configuration and at no time does any portion of either hinge knuckle 114 or 124 extend below the plane extending out from the underside of base plate 110; this is due to the hinging configuration referred to as "one leaf full-swaged".

Referring again to FIG. 4, stop member 150 is comprised of an alignment plate 130, a stop plate 140, and considerations herein further described:

Alignment plate 130 is elongated, substantially rectangular, extends in a plane substantially parallel to hinge plate 120 and has a length and width substantially similar to hinge plate 120; although in another embodiment alignment plate 130 may have dimensions dissimilar to hinge plate 120. Alignment plate 130 further comprises a plurality of fastener openings 132 (four fastener openings 132 are shown) also generally located near each corner of alignment plate 130 and each concentrically aligned with its respective fastener opening 122 of hinge plate 120 and fastener opening 112 of base plate 110 when the portable workpiece stopping device 100 is configured in an obstructing position and stop member 150 is center-located (described below). Like fastener openings 122 of hinge plate 120, fastener openings 132 of alignment plate 130 are also of such a diameter as to allow the entire mounting fastener 162 to pass completely though thereby allowing alignment plate 130 to also be completely unencumbered by mounting fasteners 162.

A front portion of alignment plate 130 further comprises at least one elongated opening 137 (two elongated openings 137 are shown) disposed to receive studs 117 of base plate 110 as studs 117 extend upwardly and proud of hinge plate 120 and proud of alignment plate 130.

A rear portion of alignment plate 130 further comprises at least one elongated opening 138 (two elongated openings 138 are shown) disposed to receive studs 128 of hinge plate 120 as studs 128 extend upwardly and proud of alignment plate 130.

Elongated openings 137 and 138 of alignment plate 130 are elongated in a direction of the longitudinal orientation between the device 100 and the primary tool. Elongated openings 137 and 138 allow stop member 150 to be moved horizontally both laterally in a direction of the longitudinal orientation and rotationally about an approximate vertical axis, as indicated by Arrow Set A, relative to base plate 110; both movement capabilities are limited by the length and width of elongated openings 137 and 138 relative to studs 117 of base plate 110 and studs 128 of hinge plate 120, respectively. When in use, fastening devices 160 cooperate with the aforementioned openings and studs to accommodate fine longitudinal and rotational adjustments of stop member 150 (i.e., alignment plate 130 and stop plate 140), relative to the primary tool.

Stop plate 140 is elongated, substantially rectangular, extends in a similar length orientation but is substantially perpendicular to alignment plate 130. Stop plate 140 is substantially the same length as alignment plate 130 and fixedly coupled along the entire length of stop plate 140; although in another embodiment stop plate 140 may have length dimensions dissimilar to alignment plate 130.

Stop plate 140 further comprises an elongated opening or slot 144 disposed substantially perpendicular to alignment plate 130 and which passes entirely through the thickness of stop plate 140 to accommodate support shelf 170 (described below).

Stop plate 140 further comprises top corners 142 that are rounded, chamfered, beveled, or otherwise configured to be substantially devoid of a sharp edge or point, thereby creating a safer work condition and allowing for the top edge of stop plate 140, when configured in a non-obstructing position (described below), to rest on a work surface (e.g., work surface 26. FIG. 1) without damaging the work surface.

The portable workpiece stopping device 100 can be positioned on either side of a primary tool wherein either abutment surface 140A or 140B of stop plate 140 can face the primary tool. Additionally, when configured in an obstructing position (described below), a top portion of stop plate 140 is disposed to extend somewhat above the primary tool's resting plane (e.g., resting plane 25 of miter saw 21, FIG. 1).

Additionally, the alignment plate 130/stop plate 140 configuration may be T-shaped or L-shaped and any known method may be used to connect the components either permanently or temporarily, or the components may be fabricated as one piece.

Support shelf 170, as an assembly, is adjustably coupled to stop plate 140 and comprises the following: a protruding platform 171, a slide leg 172, a shelf key 173, a key hole 174, a cooperating screw 176, and a fastening device 178. Protruding platform 171 is a horizontal workpiece support surface disposed substantially horizontal and perpendicular to stop plate 140 as well as parallel to base plate 110; slide leg 172 is disposed substantially parallel to stop plate 140 and further comprises a shelf key 173, affixed to a surface thereon, and a smooth-walled key hole 174 passing fully through slide leg 172 and shelf key 173—although in another embodiment key hole 174 may be threaded. Support shelf 170 is heightwise adjustably coupled to stop plate 140 by first inserting cooperating screw 176 through key hole 174, by second inserting shelf key 173 into slot 144 of stop plate 140, and by third attaching fastening device 178 onto cooperating screw 176. When stop plate 140 is configured in the obstructing position (described below) support shelf 170 is disposed to carry an abutment-end of a workpiece (i.e., the end pressed against stop plate 140) after support shelf 170 has been height adjusted relative to base plate 110 and after support shelf 170 has been fixedly coupled to stop plate 140 by tightening fastening device 178 down upon cooperating screw 176. Additionally, due to the configuration of shelf key 173 on slide leg 172, resting platform 171 is restricted to an upward/downward sliding movement and does not rotate or tilt under the weight of the workpiece. Further, support shelf 170 may be coupled to stop plate 140 on either abutment surface 140A or 140B; preferably on the abutment surface that faces the primary tool (e.g. miter saw 21, FIG. 1).

In this embodiment, the mounting plane is defined by the underside of base plate 110, the intermediate body of the operating mechanism is defined by hinge plate 120, the stop member is defined by stop member 150 (alignment plate 130 and stop plate 140; stop plate 140 also defines the stop face), the portion of the operating mechanism defining the prescribed direction of movement between obstructing and non-obstructing positions is defined by hinge Axis A, when in the obstructing position the action stop of the operating mechanism is defined by the nesting of hinge plate 120 resting on base plate 110, the adjustment mechanism is defined by studs 128 and elongated openings 138, the clamping member of the adjustment mechanism is defined by fastening devices 160 on studs 128, and the clamping member of the operating mechanism is defined by fastening devices 160 on studs 117.

The portable workpiece stopping device 100 is located and configured in an obstructing position (described below), relative to a primary tool, in order to block, obstruct, or otherwise stop the abutment-end of a workpiece pressed against stop plate 140 so that any number of same-length cuts can be made. As required, the portable workpiece stopping device 100 can be quickly reconfigured into a non-obstructing position (also described below) to create an unfettered resting plane without affecting the essential positioning of stop member 150 relative to the primary tool (e.g., resting plane 25 of miter saw 21, FIG. 1). The following information describes practical field setup and use of the portable workpiece stopping device 100:

Firstly, prior to using the portable workpiece stopping device 100 on a construction project, referring to FIG. 4, the unit is assembled in an obstructing position and stop member 150 is center-located by following Procedure 100A:

a) knuckles 114 of base plate 110 are first meshed with knuckles 124 of hinge plate 120;

b) base plate 110 and hinge plate 120 are then rotatably coupled by insertion of hinge pin 129 into pin channel 115 of base plate 110 and pin channel 125 of hinge plate 120;

c) hinge plate 120 is then rested atop and nested with base plate 110 resulting in studs 117 of base plate 110 extending proud of stud holes 127 of hinge plate 120;

d) stop member 150 is now positioned atop hinge plate 120 such that elongated openings 137 and 138 of alignment plate 130 receive studs 117 of base plate 110 and studs 128 of hinge plate 120, respectively;

e) fastening devices 160 are then fitted onto studs 117 and 128, of base plate 110 and hinge plate 120, respectively, although not tightened;

f) support shelf 170 is now slideably coupled to stop plate 140 by first inserting shelf key 173 into slot 144 of stop plate 140, by second inserting cooperating screw 176 through key hole 174 of support shelf 170, and by third connecting cooperating screw 176 to fastening device 178;

g) while fastening devices 160 are in a loosened condition, stop member 150 is then center-located both laterally and rotationally, within available limits, as indicated by Arrow Set A, by moving stop member 150 as needed to locate all studs 117 and 128 to a mid-position along the length of elongated openings 137 and 138, respectively; as a result all fastener openings 132, 122, and 112 of alignment plate 130, hinge plate 120, and base plate 110, respectively, are concentrically aligned;

h) lastly, to fixedly couple stop member 150 to base plate 110 and hinge plate 120, fastening devices 160 are tightened down upon studs 117 and 128, respectively.

Secondly, prior to using the portable workpiece stopping device 100 on a construction project, referring to FIG. 1, the unit is roughed into position on work surface 26 by following Procedure 100B:

a) workpiece length L is first determined from the particular construction task at hand, thereafter allowing repetitive same-length cuts be made to any number of workpieces;

b) relative to the primary tool, miter saw 21, the portable workpiece stopping device 100 is then placed on either side of said tool, as work station 20 requires, on work surface 26, with stop plate 140 being positioned at approximately length L from saw blade 22 of miter saw 21; that is, a close but not precise measurement (e.g., +/−13 mm or ½") is made between cutting plane 23 of saw blade 22, and abutment surface 140A or 140B of stop plate 140 (whichever is facing miter saw 21), so as to position the unit within length adjustment range;

c) stop plate 140 is also positioned approximately perpendicular to the longitudinal orientation of workpiece 10 so as to position the unit within rotational adjustment range;

d) lastly, base plate 110 is attached to work surface 26 by inserting one or more mounting fasteners 162 through fastener openings 132 of alignment plate 130 and through fastener openings 122 of hinge plate 120 and into fastener openings 112 of base plate 110 screwing the base plate 110 to work surface 26.

Thirdly, to use the portable workpiece stopping device 100 on a construction project, referring to FIG. 1, stop plate 150 is precisely adjusted using a solitary workpiece 10 by following Procedure 100C:

a) the height of resting plane 25 of miter saw 21 is first measured relative to work surface 26;

b) the corresponding height of support shelf 170, also relative to work surface 26, is then arranged in position by loosening fastening device 178 from cooperating screw 176 of support shelf 170, and sliding shelf key 173, as required, within slot 144 of stop plate 140, and retightening fastening device 178 against cooperating screw 176;

c) fastening devices 160 are then loosened from studs 117 and 128 of base plate 110 and hinge plate 120, respectively, subsequently loosening stop member 150;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to length L along workpiece 10 where a length-mark is inscribed (typically with a pencil);

f) with the abutment-end of workpiece 10 resting on support shelf 170 of stop member 150, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 140A or 140B (whichever is facing the primary tool, miter saw 21) of stop plate 140 is then brought into full and complete contact with the abutment-end of workpiece 10; thereby performing required lateral and rotational adjustments of stop member 150 to accommodate specific workpiece 10 abutment-end length and squareness requirements, respectively;

i) stop member 150 is now fixed into position by tightening all fastening devices 160 down upon studs 117 and 128 of base plate 110 and hinge plate 120, respectively;

j) lastly, the partial-depth cut on workpiece 10 is cut entirely through by blade 22 of miter saw 21, afterwhich length L of workpiece 10 is verified.

Upon completion of the above procedure, the portable workpiece stopping device 100 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 100 is quickly reconfigured into a non-obstructing position by following Procedure 100D:

a) rear fastening devices 160 only are first verified to be tightly secured upon studs 128 of hinge plate 120 thereby ensuring that stop member 150 and hinge plate 120 are a fixedly coupled assembly;

b) front fastening devices 160 only are then removed from studs 117 of base plate 110;

c) lastly, stop member 150 and hinge plate 120, as a fixedly coupled assembly, is rotated vertically up and away from base plate 110 requiring the top edge of stop plate 140 to come to rest on work surface 26.

Upon completion of the above procedure, the portable workpiece stopping device 100 is configured in a non-obstructing position thereby creating an unfettered work zone and resting plane 25 relative to miter saw 21, without affecting the essential positioning of stop member 150, also relative to miter saw 21.

Fifthly, the repetitive same-length cutting operation can resume by following Procedure 200E:

a) the stop member 150/hinge plate 120 assembly is first rotated back to an obstructing position wherein hinge plate 120 is again nested with base plate 110 and studs 117 of base plate 110 protrude through stud holes 127 of hinge plate 120 and through elongated openings 137 of alignment plate 130;

b) lastly, front fastening devices 160 are re-engaged and securely tightened down upon studs 117 of base plate 110 thereby again fixedly coupling stop member 150 and hinge plate 120 to base plate 110.

Upon completion of the above procedure, the portable workpiece stopping device 100 is configured back into an obstructing position wherein, most importantly, stop plate 140, relative to the primary tool, returns to the same position as prior to interruption. The same-length cutting operation can then resume after incurring very little down-time or disruption.

Figure 5:
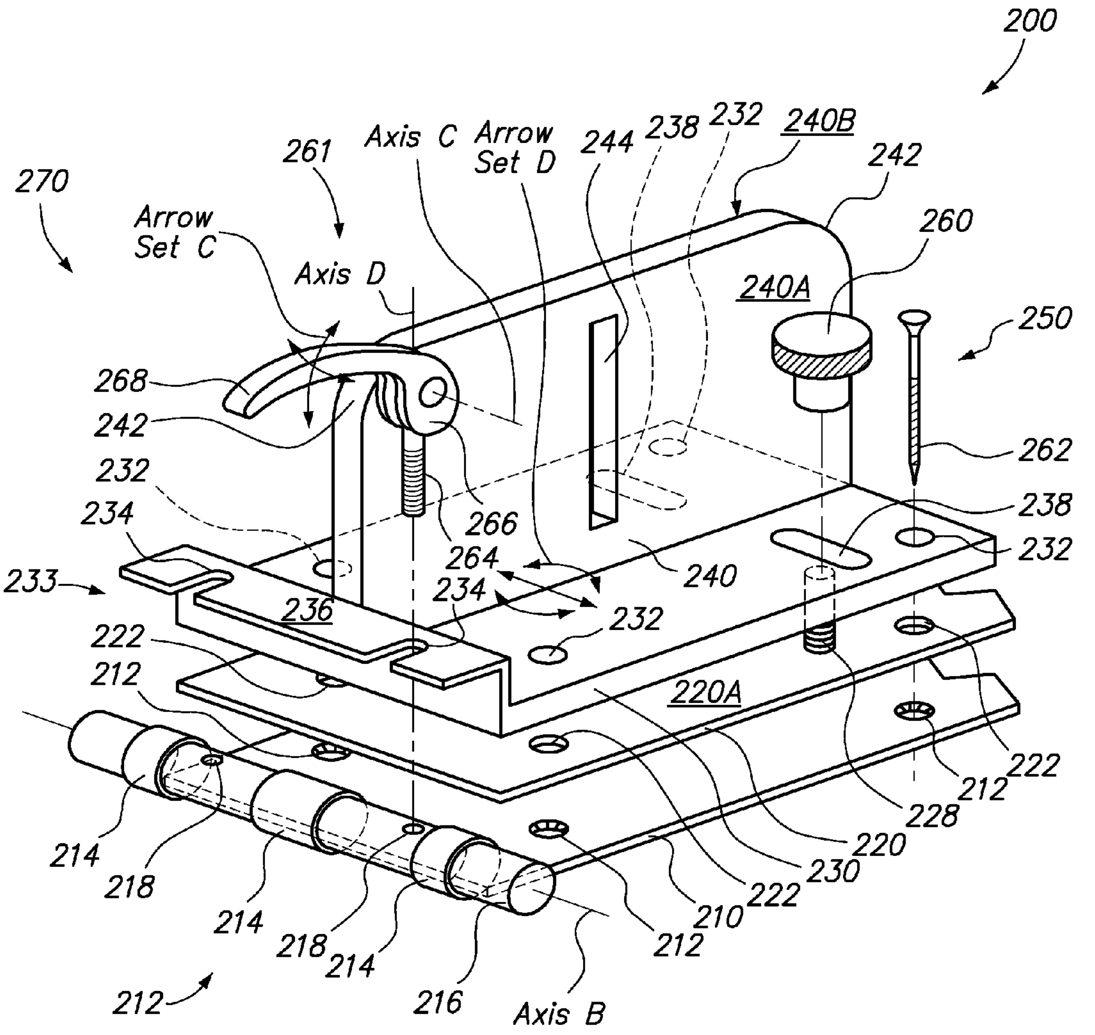
FIG. 5 is an exploded partial perspective view of another embodiment of a portable workpiece stopping device in accordance with the invention.

Referring now to FIG. 5, a partial exploded assembly view of the portable workpiece stopping device 200 in accordance with one embodiment of the invention is shown. The primary components being comprised of a base plate 210, a hinge plate 220, a stop member 250 (further comprising an alignment plate 230 and a stop plate 240), and a support shelf (not shown). Each component is preferably constructed of relatively strong and corrosion resistant materials such as stainless steel. As previously described however, with respect to the portable workpiece stopping device 100 embodiment, a variety of materials and processes may be used to fabricate the various components.

The portable workpiece stopping device 200, similar to the portable workpiece stopping device 100 previously described, now comprises a front quick-release mechanism, shown generally at 270, to hasten the transition from an obstructing position to a non-obstructing position and vice versa (described below).

Base plate 210 is elongated between the front and rear portions, substantially rectangular, and extends in a plane substantially parallel to the work surface on which it is mounted (e.g., work surface 26, FIG. 1). The underside of base plate 210 also defines the mounting plane. Base plate 210 further comprises a plurality of fastener openings 212 spaced apart in two different directions relative to one another within the mounting plane (four fastener openings 212 are shown) for receiving mounting fasteners 262 (e.g., wood screws, commonly available on construction projects) to attach base plate 210 to the work surface. Fastener openings 212 are generally located near each corner and are sized to allow only the threaded and shaft portions of mounting fasteners 262 to pass through and to not allow the head portion of the fastener to pass through. Additionally, the underside of base plate 210, the mounting plane, engages the work surface when the device 200 is mounted.

A front portion of base plate 210 is fitted with a front slide assembly, show generally at 212. Slide assembly 212 is comprised of at least two elongated channels or slide rings 214 (three slide rings 214 are shown) to cooperate with axle shaft 216 which is fitted with at least one threaded hole 218 (two threaded holes 218 are shown). Axle shaft 216, when inserted into slide rings 214 of base plate 210, is adapted to slide and rotate as indicated by Arrow Set B about Axis B. Additionally, Axis B is oriented parallel to the hinge axis which defines a rotational movement of hinge plate 220 (described below) relative to base plate 210. Threaded hole 218 of axle shaft 216 cooperates with a clamp mechanism, shown generally at 261 (one clamp mechanism 261 is shown). The clamp mechanism 261 is comprised of a threaded shaft 264, a cam lobe 266, and an actuation lever 268. The actuation lever 268 rotates about Axes C and D, as indicated by Arrow Set C, and when arranged in an obstructing position (described below) rotates vertically as part of its clamping capability and horizontally as part of its pressure adjustment capability (both described in greater detail below). Axis C is perpendicular to the lengthwise direction of threaded shaft 264 and Axis D is the longitudinal axis of the shaft 264 which is mounted radially in relation to Axis B.

A rear portion of base plate 210 comprises a first hinge portion, not shown, which is equivalent to first hinge portion 116 of base plate 110 (refer to FIG. 4 and the portable workpiece stopping device 100 embodiment previously described).

Hinge plate 220 is elongated, substantially rectangular, extends in a plane substantially parallel to base plate 210 when disposed in an obstructing position (described below) and has a length and width substantially similar to base plate 210; although in another embodiment hinge plate 220 may have dimensions dissimilar to base plate 210. Hinge plate 220 comprises a plurality of fastener openings 222 (four fastener openings 222 are shown) for receiving mounting fasteners 262. Fastener openings 222 are also generally located near each corner of hinge plate 220 and are each concentrically aligned with its respective fastener opening 212 of base plate 210 when configured in an obstructing position (described below). Further, fastener openings 222 are larger in diameter than fastener openings 212 such that the heads of mounting fasteners 262 can pass completely through fastener opening 222 so as not to bind, clamp, or attach hinge plate 220 to base plate 210; rather, once mounting fasteners 262 are installed, hinge plate 220 is completely unencumbered by mounting fasteners 262.

A rear portion of hinge plate 220 comprises at least one post or stud 228 (one stud 228 is shown) protruding upwardly from and perpendicular to a top surface 220A and are adapted to receive a fastening device 260 such as a wing nut, thumb knob, clamp, or the like. Studs 228 are of adequate height and extend proud of alignment plate 230 (described below). Further, studs 228 are affixed to hinge plate 220 by, for example, a threading arrangement, a weld, a pressed mechanical bond, an integrating molding process, or by any other acceptable method.

The rear portion of hinge plate 220 further comprises a second hinge portion, not shown, which is equivalent to second hinge portion 126 of base plate 110. Likewise, hinge plate 220 is coupled to base plate 210 in the same manner as hinge plate 120 is coupled to base plate 110 (refer to FIG. 4 and the portable workpiece stopping device 100 embodiment previously described).

Referring again to FIG. 5, stop member 250 is comprised of an alignment plate 230, a stop plate 240, and considerations herein further described:

Alignment plate 230 is elongated, substantially rectangular, extends in a plane substantially parallel to hinge plate 220 and has a length and width substantially similar to hinge plate 220; although in another embodiment alignment plate 230 may have dimensions dissimilar to hinge plate 220. Alignment plate 230 further comprises a plurality of fastener openings 232 (four fastener openings 232 are shown) also generally located near each corner of alignment plate 230 and each concentrically aligned with its respective fastener opening 222 of hinge plate 220 and fastener opening 212 of base plate 210 when the portable workpiece stopping device 200 is configured in an obstructing position and stop member 250 is center-located (described below). Like fastener openings 222 of hinge plate 220, fastener openings 232 of alignment plate 230 are also of such a diameter as to allow the entire mounting fastener 262 to pass completely though thereby allowing alignment plate 230 to also be completely unencumbered by mounting fasteners 262.

A front portion of alignment plate 230 comprises a front slot bracket, shown generally at 233 comprises at least one open slot 234 (two open slots 234 are shown) and a clamp surface 236. When in the obstructing position, slot bracket 233 is positioned above and unable to come in contact with either axle shaft 216 or slide rings 214; that is, the underside of clamp surface 233 is situated at a height that is greater than the diameter of axle shaft 216 or slide rings 214. Additionally, open slots 234 are oriented radially in relation to the hinge axis of base plate 210 and hinge plate 220 so as to be open to the end of base plate 210 opposite the hinge axis.

A rear portion of alignment plate 230 further comprises at least one elongated opening 238 (two elongated openings 238 are shown) disposed to receive studs 228 of hinge plate 220 as studs 228 extend upwardly and proud of alignment plate 230. Elongated openings 238 of alignment plate 230 and sliding/rotating axle shaft 216 of base plate 210 cooperate to allow stop member 250 to be moved horizontally both laterally in a direction of the longitudinal orientation, relative to the primary tool, and rotationally about an approximate vertical axis, as indicated by Arrow Set D, relative to hinge plate 220 and base plate 210; both movement capabilities are limited by the length and width of elongated openings 238 relative to studs 228 of hinge plate 220, and by the lateral and rotational limits of axle shaft 216 and clamp mechanisms 261 of base plate 210. When in use, fastening devices 260 cooperate with the aforementioned openings, studs, and mechanisms to accommodate fine lateral and rotational adjustments of stop member 250 (i.e., alignment plate 230 and stop plate 240), relative to a primary tool.

Stop plate is elongated, substantially rectangular, extends in an similar length orientation but is substantially perpendicular to alignment plate 230. Stop plate 340 is substantially the same length as alignment plate 330 and fixedly coupled along the entire length of stop plate 240; although in another embodiment stop plate 240 may have length dimensions dissimilar to alignment plate 230.

Stop plate 240 further comprises an elongated opening or slot 244 disposed substantially perpendicular to alignment plate 230 and which passes entirely through the thickness of stop plate 240 to accommodate support shelf 270 (described below).

Stop plate 240 further comprises top corners 242 that are rounded, chamfered, beveled, or otherwise configured to be substantially devoid of a sharp edge or point, thereby creating a safer work condition and allowing for the top edge of stop plate 240, when configured in a non-obstructing position (described below), to rest on a work surface (e.g., work surface 26. FIG. 1) without damaging the work surface.

The portable workpiece stopping device 200 can be positioned on either side of a primary tool wherein either abutment surface 240A or 240B of stop plate 240 can face the primary tool. Additionally, when configured in an obstructing position (described below), a top portion of stop plate 240 is disposed to extend somewhat above the primary tool's resting plane (e.g., resting plane 25 of miter saw 21, FIG. 1).

Additionally, the alignment plate 230/stop plate 240 configuration may be T-shaped or L-shaped and any known method may be used to connect the components either permanently or temporarily, or the components may be fabricated as one piece.

The portable workpiece stopping device 200 also comprises a support shelf (not shown) which is exactly the same, for all intents and purposes, as support shelf 170 previously described in the portable workpiece stopping device 100 embodiment.

In this embodiment, the mounting plane is defined by the underside of base plate 210, the intermediate body of the operating mechanism is defined by hinge plate 220, the stop member is defined by stop member 250 (alignment plate 230 and stop plate 240; stop plate 240 also defines the stop face), the portion of the operating mechanism defining the prescribed direction of movement between obstructing and non-obstructing positions is defined by the hinge axis between the base plate 210 and the hinge plate 220, when in the obstructing position the action stop of the operating mechanism is defined by the nesting of hinge plate 220 resting on base plate 210, the adjustment mechanism is defined by studs 228 and slots 238, the clamping member of the adjustment mechanism is defined by fastening devices 260 on studs 228, and the clamping member of the operating mechanism is defined by clamp mechanisms 261 clamping down on slot bracket 233.

The portable workpiece stopping device 200 is located and configured in an obstructing position (described below), relative to a primary tool, in order to block, obstruct, or otherwise stop the abutment-end of a workpiece pressed against stop plate 240 so that any number of same-length cuts can be made. As required, the portable workpiece stopping device 200 can be quickly reconfigured into a non-obstructing position (also described below) to create an unfettered resting plane without affecting the essential positioning of stop member 250 relative to the primary tool (e.g., resting plane 25 of miter saw 21, FIG. 1). The following information describes practical field setup and use of the portable workpiece stopping device 100:

Firstly, prior to using the portable workpiece stopping device 200 on a construction project, referring to FIG. 5, the unit is assembled in an obstructing position and stop member 250 is center-located by following Procedure 200A:

a) base plate 210 and hinge plate 220 are first meshed together and rotatably coupled by following Procedure 100A, steps a-c, with respect to the portable workpiece stopping device 100 embodiment previously described;
b) stop member 250 is now positioned atop hinge plate 220 such that elongated openings 238 of alignment plate 230 receive studs 228 of hinge plate 220;
c) fastening devices 260 are then fitted onto studs 228 of hinge plate 220 although not tightened;
d) axle shaft 216 is then inserted into slide rings 214;
e) clamp mechanisms 261 are then coupled to axle shaft 216 by insertion of threaded shafts 264 of clamp mechanisms 261 into threaded holes 218 of axle shaft 216 and rotatably adjusted about Axis D as required to exert sufficiently strong pressure force of cam lobes 266 of clamp mechanisms 261 onto clamp surface 236 of slot bracket 232;
f) the base plate 110 is then loosely front coupled to alignment plate 130 by rotating axle shaft 216 and clamp mechanisms 261 into open slots 234 of slot bracket 232;

g) support shelf 270 is now slideably coupled to stop plate 240 by first inserting shelf key 273 into slot 244 of stop plate 240, by second inserting cooperating screw 276 through key hole 374 of support shelf 370, and by third connecting cooperating screw 276 to thumb knob 278;

h) while all fastening devices are in a loosened condition, stop member 250 is then center-located both laterally and rotationally, within available limits, as indicated by Arrow Set D, by moving stop member 250 as needed to locate studs 228 of hinge plate 220 to a mid-position along the length of elongated slots 238 of alignment plate 230, and to a laterally central position of axle shaft 216 between slide rings 214 of base plate 210; as a result all fastener openings 232, 222, and 212 of alignment plate 230, hinge plate 220, and base plate 210, respectively, are concentrically aligned;

i) lastly, to fixedly couple stop member 250 to base plate 210 and hinge plate 220, actuation levers 268 of clamp mechanisms 261 are rotated downward to exert a sufficiently strong pressure force by cam lobes 266 upon clamp surface 236 of slot bracket 232, and fastening devices 260 are tightened down upon studs 228 of hinge plate 220, respectively.

Secondly, prior to using the portable workpiece stopping device 200 on a construction project, referring to FIG. 1, the unit is roughed into position on work surface 26 by following Procedure 200B:

a) workpiece length L is first determined from the particular construction task at hand, thereafter allowing repetitive same-length cuts be made to any number of workpieces;

b) relative to the primary tool, miter saw 21, the portable workpiece stopping device 200 is then placed on either side of said tool, as work station 20 requires, on work surface 26, with stop plate 240 being positioned at approximately length L from saw blade 22 of miter saw 21; that is, a close but not precise measurement (e.g., +/−13 mm or ½") is made between cutting plane 23 of saw blade 22, and abutment surface 240A or 240B of stop plate 240 (whichever is facing miter saw 21), so as to position the unit within length adjustment range;

c) stop plate 240 is also positioned approximately perpendicular to the longitudinal orientation of workpiece 10 so as to position the unit within rotational adjustment range;

d) lastly, base plate 210 is attached to work surface 26 by inserting one or more mounting fasteners 262 through fastener openings 232 of alignment plate 230 and through fastener openings 222 of hinge plate 220 and into fastener openings 212 of base plate 210 screwing the plate 210 to work surface 26.

Thirdly, to use the portable workpiece stopping device 200 on a construction project, referring to FIG. 1, stop plate 250 is precisely adjusted using a solitary workpiece 10 by following Procedure 200C:

a) the height of resting plane 25 of miter saw 21 is first measured relative to work surface 26;

b) the corresponding height of support shelf 270, also relative to work surface 26, is then arranged in position by loosening thumb knob 278 from cooperating screw 276 of support shelf 270, and sliding shelf key 273, as required, within slot 244 of stop plate 240, and retightening thumb knob 278 against cooperating screw 276;

c) fastening devices 260 are then loosened from studs 228 of hinge plate 220 and actuation levers 268 of clamping mechanisms 261 are lifted to release the pressure exerted by cam lobes 266 upon clamp surface 236 of slot bracket 232, subsequently loosening stop member 250;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to length L along workpiece 10 where a length-mark is inscribed (typically with a pencil);

f) with the abutment-end of workpiece 10 resting on support shelf 270 of stop member 250, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 240A or 240B (whichever is facing the primary tool, miter saw 21) of stop plate 240 is then brought into full and complete contact with the abutment-end of workpiece 10; thereby performing required lateral and rotational adjustments of stop member 250 to accommodate specific workpiece 10 abutment-end length and squareness requirements, respectively;

i) stop member 250 is now fixed into position by tightening fastening devices 260 down upon studs 228 of hinge plate 220 and lowering actuation levers 268 of clamp mechanisms 261 thereby re-exerting the clamping forces created by cam lobes 266 upon clamp surface 236 of slot bracket 232;

j) lastly, the partial-depth cut on workpiece 10 is cut entirely through by blade 22 of miter saw 21, afterwhich length L of workpiece 10 is verified.

Upon completion of the above procedure, the portable workpiece stopping device 200 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 200 is quickly reconfigured into a non-obstructing position by following Procedure 200D:

a) fastening devices 260 are first verified to be tightly secured upon studs 228 of hinge plate 220 thereby ensuring that stop member 250 and hinge plate 220 are a fixedly coupled assembly;

b) actuation levers 268 of clamp mechanisms 261 are then lifted to release the pressure forces exerted by cam lobes 266 on clamp surface 236 of slot bracket 232;

c) axle shaft 216 and clamp mechanisms 261 are then rotated forward, away from open slots 234 of slot bracket 232;

d) lastly, stop member 250 and hinge plate 220, as a fixedly coupled assembly, is rotated vertically up and away from base plate 210 requiring the top edge of stop plate 240 to come to rest on work surface 26.

Upon completion of the above procedure, the portable workpiece stopping device 200 is configured in a non-obstructing position thereby creating an unfettered work zone and resting plane 25 relative to miter saw 21, without affecting the essential positioning of stop member 250, also relative to miter saw 21.

Fifthly, the repetitive same-length cutting operation can resume by following Procedure 200E:

a) the stop member 250/hinge plate 220 assembly is first rotated back to an obstructing position wherein hinge plate 220 is nested again with base plate 210;

b) the alignment plate 230 is again front coupled to base plate 210 by rotating axle shaft 216 and clamp mechanisms 261 back into open slots 234 of slot bracket 232;

c) lastly, actuation levers 268 of clamp mechanisms 261 are again rotated downward to exert a pressure force by cam lobes 266 upon clamp surface 236 of slot bracket 232 thereby again fixedly coupling the stop member 250/hinge plate 220 assembly to base plate 210.

Upon completion of the above procedure, the portable workpiece stopping device 200 is configured back into an obstructing position wherein, most importantly, stop plate 240, relative to the primary tool, returns to the same position as prior to interruption. The same-length cutting operation can then resume after incurring very little down-time or disruption.

Figure 6:
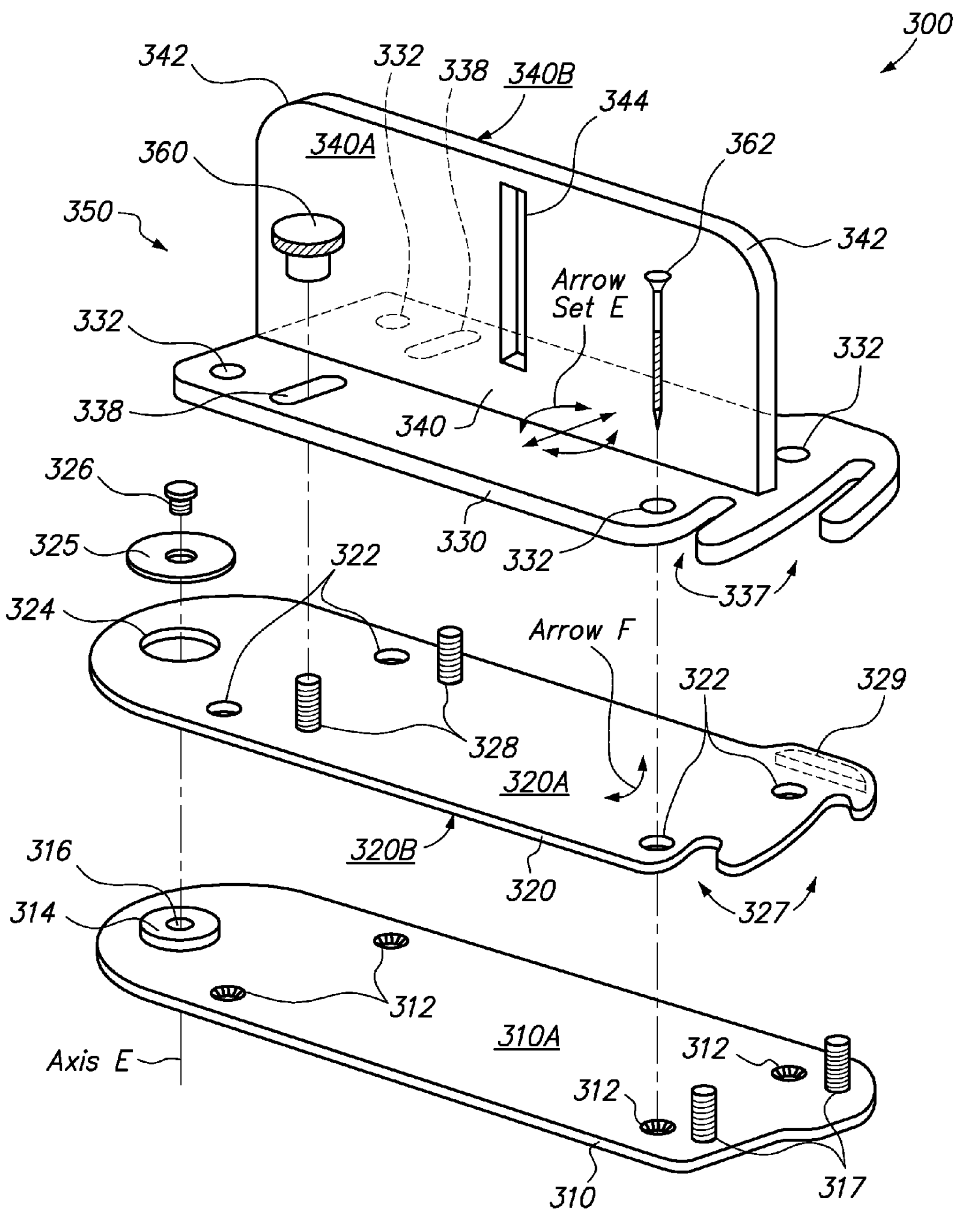
FIG. 6 is an exploded perspective view of another embodiment of a portable workpiece stopping device in accordance with the invention.

Referring now to FIG. 6, an exploded assembly view of the portable workpiece stopping device 300 in accordance with one embodiment of the invention is shown. The primary components being comprised of a base plate 310, a pivot plate 320, a stop member 350 (further comprising an alignment plate 330 and a stop plate 340), and a support shelf, shown generally at 370. Each component is preferably fabricated of relatively strong and corrosion resistant materials such as stainless steel. As previously described however, with respect to the portable workpiece stopping device 100 embodiment, a variety of materials and processes may be used to fabricate the various components.

Base plate 310 is elongated between the front and rear portions, roughly rectangular, although half-circular at a rear portion, and extends in a plane substantially parallel to the work surface on which it is mounted (e.g., work surface 26, FIG. 1). The underside of base plate 310 also defines the mounting plane. Base plate 310 further comprises a plurality of fastener openings 312 spaced apart in two different directions relative to one another within the mounting plane (four fastener openings 312 are shown) for receiving mounting fasteners 362 (e.g., wood screws, commonly available on construction projects) to attach base plate 310 to the work surface. Fastener openings 312 are roughly located near each corner and are sized to allow only the threaded and shaft portions of mounting fasteners 362 to pass through and to not allow the head portion of the fastener to pass through. Additionally, the underside of base plate 310, the mounting plane, engages the work surface when the device 300 is mounted.

A front portion of base plate 310 comprises at least one post or stud 317 (two studs 317 are shown) protruding upwardly from and perpendicular to a top surface 310A and is adapted to receive a fastening device 360 such as a wing nut, thumb knob, clamp, or the like. Studs 317 are of adequate height, protrude through pivot plate 320 and extend proud of alignment plate 330 (both described below). Further, studs 317 are affixed to base plate 310 by, for example, a threading arrangement, a weld, a pressed mechanical bond, an integrating molding process, or by any other acceptable method.

A rear portion of base plate 310 further comprises a circular protrusion or pivot post 314 which protrudes substantially perpendicular and proud of top surface 310A. Pivot post 314 further comprises a threaded hole 316 concentrically located about Axis E and which defines a vertical axis perpendicular to the mounting plane defined by the underside of base plate 310. Further, a distil end of pivot post 314, when rotatably coupled with pivot bore 324 of pivot plate 320 (described below), does not protrude proud of top surface 320A of pivot plate 320.

Pivot plate 320 is elongated, roughly rectangular, although half-circular at a rear portion, and extends in a plane substantially parallel to base plate 310 and has a length and width substantially similar to base plate 310; although in another embodiment pivot plate 320 may have dimensions dissimilar to base plate 310. Pivot plate 320 further comprises a plurality of fastener openings 322 (four fastener openings 322 are shown) for receiving mounting fasteners 362. Fastener openings 322 are also roughly located near each corner of pivot plate 320 and are each concentrically aligned with its respective fastener opening 312 of base plate 310 when configured in an obstructing position (described below). Further, fastener openings 322 are larger in diameter than fastener openings 312 such that the heads of mounting fasteners 362 can pass completely through fastener opening 322 so as not to bind, clamp, or attach pivot plate 320 to base plate 310; rather, once mounting fasteners 362 are installed, pivot plate 320 is completely unencumbered by mounting fasteners 362.

A front portion of pivot plate 320 comprises one or more grooves or slotted openings 327 (two slotted openings 327 are shown) disposed to receive studs 317 of base plate 310 as studs 317 extend upwardly and proud of pivot plate 320 when the portable workpiece stopping device 100 is configured in an obstructing position (described below).

The front portion of pivot plate 320 further comprises an alignment stop 329 that is attached to a location on the bottom surface 320B of pivot plate 320. When the portable workpiece stopping device 300 is configured in an obstructing position (described below) an edge surface of alignment stop 329 contacts an edge surface of base plate 310 to terminate the rotation and properly align pivot plate 320 with base plate 310. During transition to a non-obstructing position (also described below) alignment stop 329 moves away from base plate 310, as indicated by the relevant arrow of double Arrow F, to a random position far enough away from base plate 310 to create an unfettered resting plane relative to a primary tool (e.g., resting plane 25 of miter saw 21, FIG. 1). Additionally, when pivot plate 320 is configured in a non-obstructing position alignment stop 329 provides support to accommodate the weight of pivot plate 320 and attached components. In another embodiment alignment stop 329 can be located on base plate 310 for contacting an edge surface of pivot plate 320 thus preventing further rotational movement about vertical axis E beyond the obstructing position as pivot plate 320 is rotated from the non-obstructing position to the obstructing position.

A rear portion of pivot plate 320 also comprises at least one post or stud 328 (two studs 328 are shown) protruding upwardly from and perpendicular to a top surface 320A and is adapted to receive a fastening device 360 such as a wing nut, thumb knob, clamp, or the like. Studs 328 are of adequate height and extend proud of alignment plate 130 (described below).

The rear portion of pivot plate 320 further comprises a through hole or pivot bore 324, concentrically aligned with pivot post 314 of base plate 310 about Axis E. Pivot bore 324, being slightly larger in diameter than pivot post 314, is adapted to receive pivot post 314, wherein retaining washer 325 and coupling bolt 326, also concentrically aligned with pivot bore 324 and pivot post 314 about Axis E, cooperate to rotatably couple the assembly.

Referring again to FIG. 6, stop member 350 is comprised of an alignment plate 330, a stop plate 340, and considerations herein further described:

Alignment plate 330 is elongated, roughly rectangular, extends in a plane substantially parallel to pivot plate 320 and has a length and width similar to pivot plate 320; although in another embodiment alignment plate 330 may have dimensions dissimilar to pivot plate 320 or base plate 310. Alignment plate 330 further comprises a plurality of fastener openings 332 (four fastener openings 332 are shown) also generally located near each corner of alignment plate 330 and each concentrically aligned with its respective fastener opening 322 of pivot plate 320 and fastener opening 312 of base plate 310 when the portable workpiece stopping device 300 is configured in an obstructing position and stop member 350 is center-located (described below). Like fastener openings 322 of pivot plate 320, fastener openings 332 of alignment plate 330 are also of such a diameter as to allow the entire mounting fastener 362 to pass completely though thereby allowing alignment plate 330 and pivot plate 320 to also be completely unencumbered by mounting fasteners 362.

A front portion of alignment plate 330 comprises one or more grooves or slotted openings 337 (two slotted openings 337 are shown) disposed to receive studs 317 of base plate 310 as studs 317 extend upwardly and proud of alignment plate 330.

A rear portion of alignment plate 330 comprises at least one elongated opening 338 (two elongated openings 338 are shown) disposed to receive studs 328 of pivot plate 320 as studs 328 extend upwardly and proud of alignment plate 330.

Slotted openings 337 and elongated openings 338 of alignment plate 330 are elongated in a direction of the longitudinal orientation between the device 300 and the primary tool. Slotted openings 337 and elongated openings 338 allow stop member 350 to be moved horizontally both laterally in a direction of the longitudinal orientation and rotationally about an approximate vertical axis, as indicated by Arrow Set E, relative to base plate 310; both movement capabilities are limited by the length and width of slotted openings 337 and elongated openings 338 relative to studs 317 of base plate 310 and studs 328 of pivot plate 320, respectively. When in use, fastening devices 360 cooperate with the aforementioned openings and studs to accommodate fine longitudinal and rotational adjustments of stop member 350 (i.e., alignment plate 330 and stop plate 340), relative to the primary tool.

Stop plate 340 is elongated, substantially rectangular, extends in a similar length orientation but is substantially perpendicular to alignment plate 330. Stop plate 340 is slightly shorter than pivot plate 330 and fixedly coupled along the entire length of stop plate 340; although in another embodiment stop plate 340 may be the same length, or maybe longer or shorter than alignment plate 330.

Stop plate 340 further comprises an elongated opening or slot 344 disposed substantially perpendicular to alignment plate 330 and which passes entirely through the thickness of stop plate 340 to accommodate support shelf 370 (described below).

Stop plate 340 further comprises top corners 342 that are rounded, chamfered, beveled, or otherwise configured to be substantially devoid of a sharp edge or point, thereby creating a safer work condition.

The portable workpiece stopping device 300 can be positioned on either side of a primary tool wherein either abutment surface 340A or 340B of stop plate 340 can face the primary tool. Additionally, when configured in an obstructing position (described below), a top portion of stop plate 340 is disposed to extend somewhat above the primary tool's resting plane (e.g., resting plane 25 of miter saw 21, FIG. 1).

The alignment plate 330/stop plate 340 configuration may be T-shaped or L-shaped and any known method may be used to connect the components either permanently or temporarily, or the components may be fabricated as one piece.

The portable workpiece stopping device 300 also comprises a support shelf (not shown) which is exactly the same, for all intents and purposes, as support shelf 170 previously described in the portable workpiece stopping device 100 embodiment.

In this embodiment, the mounting plane is defined by the underside of base plate 310, the intermediate body of the operating mechanism is defined by pivot plate 320, the stop member is defined by stop member 350 (alignment plate 330 and stop plate 340; stop plate 340 also defines the stop face), the portion of the operating mechanism defining the prescribed direction of movement between obstructing and non-obstructing positions is defined by the vertical rotation Axis E, when in the obstructing position the action stop of the operating mechanism is defined by the abutment of alignment stop 329 against an edge of base plate 310, the adjustment mechanism is defined by studs 328 and elongated openings 338, the clamping member of the adjustment mechanism is defined by fastening devices 360 on studs 328, and the clamping member of the operating mechanism is defined by fastening devices 360 on studs 317.

The portable workpiece stopping device 300 is located and configured in an obstructing position (described below), relative to a primary tool, in order to block, obstruct, or otherwise stop the abutment-end of a workpiece pressed against stop plate 340 so that any number of same-length cuts can be made. As required, the portable workpiece stopping device 300 can be quickly reconfigured into a non-obstructing position (also described below) to create an unfettered resting plane without affecting the essential positioning of stop member 350 relative to the primary tool (e.g., resting plane 25 of miter saw 21, FIG. 1). The following information describes practical field setup and use of the portable workpiece stopping device 100:

Firstly, prior to using the portable workpiece stopping device 300 on a construction project, referring to FIG. 6, the unit is assembled in an obstructing position and stop member 350 is center-located following Procedure 300A:

a) base plate 310 and pivot plate 320 are first rotatably coupled by concentrically engaging pivot bore 324 of pivot plate 320 about pivot post 314 of base plate 310;
b) retaining washer 325 is then concentrically positioned atop the distal surface of pivot post 314;
c) the assembly is then secured together with the insertion of coupling bolt 326 through retaining washer 325 and into threaded hole 316 of pivot post 314;
d) the edge of alignment stop 329 is then positioned to contact the edge of base plate 310 resulting in studs 317 of base plate 310 extending through slotted openings 327 of pivot plate 320;
e) stop member 350 is now positioned atop pivot plate 320 such that slotted openings 337 and elongated openings 338 of alignment plate 330 receive studs 317 of base plate 310 and studs 328 of pivot plate 320, respectively;
f) fastening devices 360 are then fitted onto studs 317 and 328, of base plate 310 and pivot plate 320, respectively, although not tightened;
g) support shelf 370 is now slideably coupled to stop plate 340 by first inserting shelf key 373 into slot 344 of stop plate 340, by second inserting cooperating screw 376 through key hole 374 of support shelf 370, and by third connecting cooperating screw 376 to thumb knob 378;
h) while fastening devices 360 are in a loosened condition, stop member 350 is then center-located both laterally and rotationally, within available limits, as indicated by Arrow Set E, by moving stop member 350 as needed to locate all studs 317 and 328 to a mid-position along the length of slotted openings 337 and elongated openings 338, respectively; as a result all fastener openings 332, 322, and 312 of alignment plate 330, pivot plate 320, and base plate 310, respectively, are concentrically aligned;

i) lastly, to fixedly couple stop member 350 to base plate 310 and pivot plate 320, fastening devices 360 are tightened down upon studs 317 and 328, respectively.

Secondly, prior to using the portable workpiece stopping device 300 on a construction project, referring to FIG. 1, the unit is roughed into position on work surface 26 by following Procedure 300B:

a) workpiece length L is first determined from the particular construction task at hand, thereafter allowing repetitive same-length cuts be made to any number of workpieces;

b) relative to the primary tool, miter saw 21, the portable workpiece stopping device 300 is then placed on either side of said tool, as work station 20 requires, on work surface 26, with stop plate 340 being positioned at approximately length L from saw blade 22 of miter saw 21; that is, a close but not precise measurement (e.g., +/−13 mm or ½") is made between cutting plane 23 of saw blade 22, and abutment surface 340A or 340B of stop plate 340 (whichever is facing miter saw 21), so as to position the unit within length adjustment range;

c) stop plate 340 is also positioned approximately perpendicular to the longitudinal orientation of workpiece 10 so as to position the unit within rotational adjustment range;

d) lastly, base plate 310 is attached to work surface 26 by inserting one or more mounting fasteners 362 through fastener openings 332 of alignment plate 330 and through fastener openings 322 of pivot plate 320 and into fastener openings 312 of base plate 310 screwing the plate 310 to work surface 26.

Thirdly, to use the portable workpiece stopping device 300 on a construction project, referring to FIG. 1, stop plate 350 is precisely adjusted using a solitary workpiece 10 by following Procedure 300C:

a) the height of resting plane 25 of miter saw 21 is first measured relative to work surface 26;

b) the corresponding height of support shelf 370, also relative to work surface 26, is then arranged in position by loosening thumb knob 378 from cooperating screw 376 of support shelf 370, and sliding shelf key 373, as required, within slot 344 of stop plate 340, and retightening thumb knob 378 against cooperating screw 376;

c) fastening devices 360 are then loosened from studs 317 and 328 of base plate 310 and pivot plate 320, respectively, subsequently loosening stop member 350;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to length L along workpiece 10 where a length-mark is inscribed (typically with a pencil);

f) with the abutment-end of workpiece 10 resting on support shelf 370 of stop member 350, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 340A or 340B (whichever is facing the primary tool, miter saw 21) of stop plate 340 is then brought into full and complete contact with the abutment-end of workpiece 10; thereby performing required lateral and rotational adjustments of stop member 350 to accommodate specific workpiece 10 abutment-end length and squareness requirements, respectively;

i) stop member 350 is now fixed into position by tightening all fastening devices 360 down upon studs 317 and 328 of base plate 310 and pivot plate 320, respectively;

j) lastly, the partial-depth cut on workpiece 10 is cut entirely through by blade 22 of miter saw 21, afterwhich length L of workpiece 10 is verified.

Upon completion of the above procedure, the portable workpiece stopping device 300 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 300 is quickly reconfigured into a non-obstructing position by following Procedure 300D:

a) rear fastening devices 360 only are first verified to be tightly secured upon studs 328 of pivot plate 320 thereby ensuring that stop member 350 and pivot plate 320 are a fixedly coupled assembly;

b) front fastening devices 360 only are then loosened from studs 317 of base plate 310 (although preferably not removed);

c) lastly, stop member 350 and pivot plate 320, as a fixedly coupled assembly, is rotated or pivoted horizontally in, for example, a counter-clockwise direction, a sufficient distance away from base plate 310 (although near complete rotation is possible, the practical use is to rotate the assembly 90° to 135° away from base plate 310);

Upon completion of the above procedure, the portable workpiece stopping device 300 is configured in a non-obstructing position thereby creating an unfettered work zone and resting plane 25 relative to miter saw 21, without affecting the essential positioning of stop member 350, also relative to miter saw 21.

Fifthly, the repetitive same-length cutting operation can resume by following Procedure 300E:

a) the stop member 350/pivot plate 320 assembly is first rotated back to an obstructing position wherein studs 317 of base plate 310 again protrude through slotted openings 327 and 337 of pivot plate 320 and alignment plate 330, respectively, and the edge of alignment stop 329 of pivot plate 320 again contacts the edge of base plate 310;

b) lastly, front fastening devices 360 are securely tightened down upon studs 317 of base plate 310 thereby again fixedly coupling stop member 350 and pivot plate 320 back to base plate 110.

Upon completion of the above procedure, the portable workpiece stopping device 300 is configured back into an obstructing position wherein, most importantly, stop plate 340, relative to the primary tool, returns to the same position as prior to interruption. The same-length cutting operation can then resume after incurring very little down-time or disruption.

Figure 7:
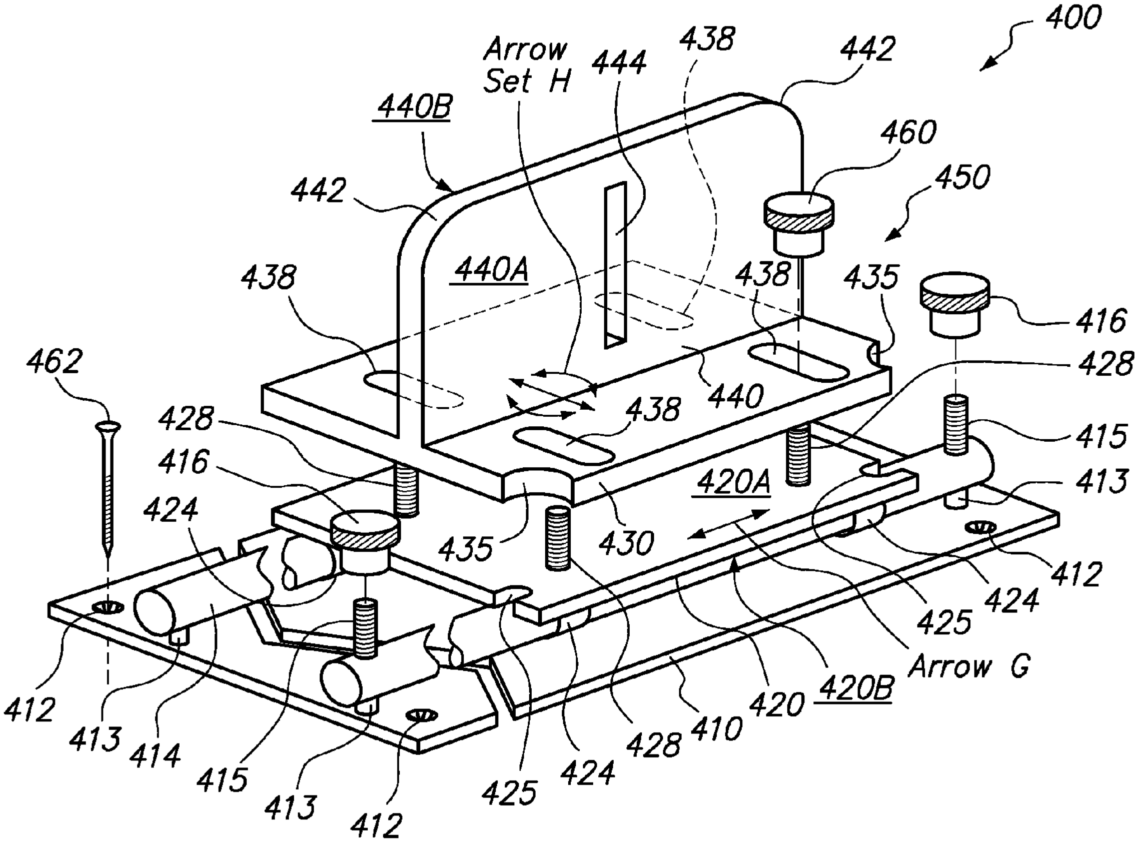
FIG. 7 is a partially exploded perspective view of another embodiment of a portable workpiece stopping device in accordance with the invention.

Referring now to FIG. 7, a partially exploded assembly view of the portable workpiece stopping device 400 in accordance with one embodiment of the invention is shown. The primary components being comprised of a base plate 410, at least one slide rail 414, a slide plate 420 comprising at least one slide tube 418, a stop member 450 (further comprising an alignment plate 430 and a stop plate 440), and a support shelf 470. Each component is preferably fabricated of relatively strong and corrosion resistant materials such as stainless steel. As previously described however, with respect to the portable workpiece stopping device 100 embodiment, other materials may be used to fabricate the various components.

Base plate 410 is considerably elongated between the front and rear portions, substantially rectangular, and extends in a plane substantially parallel to the work surface on which it is mounted (e.g. work surface 26, FIG. 1). The underside of base plate 410 also defines the mounting plane. Base plate 410 further comprises a plurality of fastener openings 412 spaced apart in two different directions relative to one another within the mounting plane (four fastener openings 412 are shown) for receiving mounting fasteners 462 (e.g., wood screws, commonly available on construction projects) to attach base plate 110 to the work surface. Fastener openings 412 are generally located near each corner and are sized to allow only the threaded and shaft portions of mounting fasteners 462 to pass through and to not allow the head portion of the fastener to pass through. Additionally, the underside of base plate 410, the mounting plane, engages the work surface when the device 400 is mounted.

Base plate 410 further comprises at least two studs or mounting posts 413 (three mounting posts 413 are shown) and one or more slide rails 414 (two slide rails 414 are shown). Mounting posts 413, one disposed near a front portion, the other near a rear portion of said slide rail(s) 414, protrude upwardly from and perpendicular to a top surface 410A of base plate 410, and downwardly from and perpendicular to bottom surfaces of slide rail(s) 414. Mounting posts 413 are sufficiently long to provide free operating clearance for slide tubes 424 of slide plate 420 (described below).

Additionally, disposed on at least two top surfaces of at least one slide rail 414, one near a front portion, the other near a rear portion, are stop posts 415 (two stop posts 415 are shown) protruding upwardly from and perpendicular to said top surfaces of slide rail(s) 414. The distal ends of stop posts 415 are sufficiently tall to accommodate slide notches 425 of slide plate 420 (described below) and are adapted to receive two or more fastening devices 416 (one fastening device 416 is shown), one near each end of said slide rail(s) 414, such as wing nuts, thumb knobs, clamps, or the like. Stop posts 415 establish the travel limits of slide plate 420 (described below) on slide rail(s) 414. Additionally, stop posts 415 are affixed to the top of slide rail(s) 414, and mounting posts 413 are affixed to the top of base plate 410 and to the bottom of slide rail(s) 414, and by, for example, a threading arrangement, a weld, a pressed mechanical bond, an integrating molding process, or by any other acceptable method.

Slide plate 420 is elongated, substantially rectangular, extends in a plane substantially parallel to base plate 410 and comprises a top surface 420A and a bottom surface 420B. Affixed to bottom surface 420B of slide plate 420 are one or more slide tubes 424 (three slide tubes 424 are shown) which cooperate with slide rails 414 of base plate 410 to permit slide tubes 424 and slide plate 420 to travel front-to-back and vice versa on slide rails 414 in the directions indicated by double Arrow G. Additionally, the slide plate 420 is linearly slidable relative to base plate 410 in the direction of a horizontal slide path which is transverse to the longitudinal orientation extending between the device 400 and the primary tool. Additionally, slide tubes 424 may comprise ball, roller, or other bearings and/or seals (not shown) to achieve a smooth, debris free gliding movement along slide rails 414.

Slide plate 420 further comprises at least one post or stud 428 (three studs 428 are shown) protruding upwardly from and perpendicular to a top surface 420A of slide plate 420 and is adapted to receive a fastening device 460 such as a wing nut, thumb knob, clamp, or the like. Studs 428 are of adequate height and extend proud of alignment plate 430 (described below). Further, studs 428 are affixed to slide plate 420 by, for example, a threading arrangement, a weld, a pressed mechanical bond, an integrating molding process, or by any other acceptable method.

Slide plate 420 further comprises at least two u-shaped features or slide notches 425 (two slide notches 425 are shown), one disposed to a front portion, the other disposed to a rear portion of slide plate 420, which engage with stop posts 415 of slide rail(s) 414. The slide notches 425 are open to respective front and rear portions of slide plate 420 which are opposite one another in the direction of the horizontal slide path as indicated by double Arrow G. Fastening devices 416 (described above) allow for selective coupling of slide notches 425 of slide plate 420 with stop posts 415 of slide rail(s) 414 to lock slide plate 420 at either a front-limit position or a rear-limit position along slide rail(s) 414.

Referring again to FIG. 7, stop member 450 is comprised of an alignment plate 430, a stop plate 440, and considerations herein further described:

Alignment plate 430 is elongated, substantially rectangular, extends in a plane substantially parallel to slide plate 420 and has a length and width substantially similar to slide plate 420; although in another embodiment alignment plate 430 may have dimensions dissimilar to slide plate 420.

Alignment plate 430 further comprises one or more elongated openings 438 (four elongated openings 438 are shown) disposed to receive studs 428 of slide plate 420 as studs 428 extend upwardly and proud of alignment plate 430. Elongated openings 438 of alignment plate 430 allow stop member 450 to be moved both laterally and rotationally, as indicated by Arrow Set H, relative to slide plate 420; both movement capabilities are limited by the length and width of elongated openings 438 relative to studs 428 of slide plate 420. When in use, fastening devices 460 cooperate with the aforementioned openings and studs to accommodate fine lateral and rotational adjustments of stop member 450 (i.e., alignment plate 430 and stop plate 440), relative to a primary tool.

Alignment plate 430 further comprises one or more j-shaped features or corner cut-outs 435 (two corner cut-outs 435 are shown) allowing unobstructed operation of the fastening devices 416 with respect to stop posts 415 of slide rail 414 and slide notches 425 of slide plate 420.

Stop plate 440 is elongated, substantially rectangular, extends in an similar length orientation but is substantially perpendicular to alignment plate 430. Stop plate 440 is substantially the same length as alignment plate 430 and fixedly coupled along the entire length of stop plate 440; although in another embodiment stop plate 440 may have length dimensions dissimilar to alignment plate 430.

Stop plate 440 further comprises an elongated opening or slot 444 disposed substantially perpendicular to alignment plate 430 and which passes entirely through the thickness of stop plate 440 to accommodate support shelf 470 (described below).

Stop plate 440 further comprises top corners 442 that are rounded, chamfered, beveled, or otherwise configured to be substantially devoid of a sharp edge or point, thereby creating a safer work condition.

The portable workpiece stopping device 400 can be positioned on either side of a primary tool wherein either abutment surface 440A or 440B of stop plate 440 can face the primary tool. Additionally, when configured in an obstructing position (described below), a top portion of stop plate 440 is disposed to extend somewhat above the primary tool's resting plane (e.g., resting plane 25 of miter saw 21, FIG. 1).

The alignment plate 430/stop plate 440 configuration may be T-shaped or L-shaped and any known method may be used to connect the components either permanently or temporarily, or the components may be fabricated as one piece.

The portable workpiece stopping device 400 also comprises a support shelf (not shown) which is exactly the same, for all intents and purposes, as support shelf 170 previously described in the portable workpiece stopping device 100 embodiment.

In this embodiment, the mounting plane is defined by the underside of base plate 410, the intermediate body of the operating mechanism is defined by slide plate 420, the stop member is defined by stop member 450 (alignment plate 430 and stop plate 440; stop plate 440 also defines the stop face), the portion of the operating mechanism defining the prescribed direction of movement between obstructing and non-obstructing positions is defined by the slide path as indicated by double Arrow G, the action stop of the operating mechanism is defined by the abutment of slide plate 420 with stop post 415 at one end of slide plate 420, the adjustment mechanism is defined by studs 428 and elongated openings 438, the clamping member of the adjustment mechanism is defined by fastening devices 460 on studs 428, and the clamping member of the operating mechanism is defined by fastening devices 416 on stop posts 415.

The portable workpiece stopping device 400 is located and configured in an obstructing position (described below), relative to a primary tool, in order to block, obstruct, or otherwise stop the abutment-end of a workpiece pressed against stop plate 440 so that any number of same-length cuts can be made. As required, the portable workpiece stopping device 400 can be quickly reconfigured into a non-obstructing position (also described below) to create an unfettered resting plane without affecting the essential positioning of stop member 450 relative to the primary tool (e.g., resting plane 25 of miter saw 21, FIG. 1). The following information describes practical field setup and use of the portable workpiece stopping device 100:

Firstly, prior to using the portable workpiece stopping device 400 on a construction project, referring to FIG. 7, the unit is assembled in an obstructing position and stop member 450 is center-located following Procedure 400A:

a) first, slide plate 420, with slide tubes 424 being affixed to bottom surface 420B, are slideable coupled to slide rails 414;

b) slide rails 414, together with the aforementioned slide plate 420, are then fixedly coupled to mounting posts 413 of base plate 410;

c) stop member 450 is now positioned atop slide plate 420 such that studs 428 protrude through elongated openings 438 of alignment plate 430;

d) fastening devices 460 are then fitted onto studs 428 of slide plate 420, although not tightened;

e) in a direction indicated by double Arrow G, slide plate 420 and stop member 450, as a loosely coupled assembly, are then slid to a front position along slide rails 414, wherein a front slide notch 425 of slide plate 420 engages with a front stop post 415 of slide rail 414, and a front fastening device 416 is tightened down upon both front slide notch 425 and front stop post 415 to affix the assembly in a front position;

f) support shelf 470 is now slideably coupled to stop plate 440 by first inserting shelf key 473 into slot 444 of stop plate 440, by second inserting cooperating screw 476 through key hole 474 of support shelf 470, and by third connecting cooperating screw 476 to thumb knob 478;

g) while fastening devices 460 are in a loosened condition, stop member 450 is then center-located both laterally and rotationally, within available limits, as indicated by Arrow Set H, by moving stop member 450 as needed to locate all studs 428 of stop plate 420 to a mid-position along the length of elongated openings 438 of alignment plate 430;

h) lastly, to fixedly couple stop member 450 to slide plate 420, fastening devices 460 are tightened down upon studs 428 of slide plate 420.

Secondly, prior to using the portable workpiece stopping device 400 on a construction project, referring to FIG. 1, the unit is roughed into position on work surface 26 by following Procedure 400B:

a) workpiece length L is first determined from the particular construction task at hand, thereafter allowing repetitive same-length cuts be made to any number of workpieces;

b) relative to the primary tool, miter saw 21, the portable workpiece stopping device 400 is then placed on either side of said tool, as work station 20 requires, on work surface 26, with stop plate 440 being positioned at approximately length L from saw blade 22 of miter saw 21; that is, a close but not precise measurement (e.g., +/−13 mm or ½") is made between cutting plane 23 of saw blade 22, and abutment surface 440A or 440B of stop plate 440 (whichever is facing miter saw 21), so as to position the unit within length adjustment range;

c) stop plate 440 is also positioned approximately transverse to the longitudinal orientation of workpiece 10 so as to position the unit within rotational adjustment range;

d) lastly, base plate 410 is attached to work surface 26 by inserting one or more mounting fasteners 462 through fastener openings 412 of base plate 410 screwing the plate 410 to work surface 26.

Thirdly, to use the portable workpiece stopping device 400 on a construction project, referring to FIG. 1, stop plate 450 is precisely adjusted using a solitary workpiece 10 by following Procedure 400C:

a) the height of resting plane 25 of miter saw 21 is first measured relative to work surface 26;

b) the corresponding height of support shelf 470, also relative to work surface 26, is then arranged in position by loosening thumb knob 478 from cooperating screw 476 of support shelf 470, and sliding shelf key 473, as required, within slot 444 of stop plate 440, and retightening thumb knob 478 against cooperating screw 476;

c) fastening devices 460 are then loosened from studs 428 of slide plate 420, respectively, subsequently loosening stop member 450;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to the length L where a length-mark is inscribed (typically with a pencil);

f) with the abutment-end of workpiece 10 resting on support shelf 470 of stop member 450, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 440A or 440B (whichever is facing the primary tool, miter saw 21) of stop plate 440 is then brought into full and complete contact with the abutment-end of workpiece 10; thereby performing required lateral and rotational adjustments of stop member 450 to accommodate specific workpiece 10 abutment-end length and squareness requirements, respectively;

i) stop member 450 is now fixed into position by tightening all fastening devices 460 down upon studs 428 of slide plate 410;

j) lastly, the partial-depth cut on workpiece 10 is cut entirely through by blade 22 of miter saw 21, afterwhich length L of workpiece 10 is verified.

Upon completion of the above procedure, the portable workpiece stopping device 400 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 400 is quickly reconfigured into a non-obstructing position by following Procedure 400D:

a) fastening devices 460 are first verified to be tightly secured upon studs 428 of slide plate 420 thereby ensuring that stop member 450 and slide plate 420 are a fixedly coupled assembly;

b) front fastening device 416 is then loosened (although preferably not removed) from front stop post 415 of slide rail 416 allowing disengagement of front slide notch 425 of slide plate 420 from front stop post 415;

c) lastly, in a direction indicated by double Arrow G, slide plate 420 and stop member 450, as a fixedly coupled assembly, is slid to a rear position along slide rails 414, wherein a rear slide notch 425 of slide plate 420 engages with a rear stop post 415 of slide rail 414 and a rear fastening device 416 is tightened down upon both rear slide notch 425 and rear stop post 415 to affix the assembly in a rear position;

Upon completion of the above procedure, the portable workpiece stopping device 400 is configured in a non-obstructing position thereby creating an unfettered work zone and resting plane 25 relative to miter saw 21, without affecting the essential positioning of stop member 450, also relative to miter saw 21.

Fifthly, the repetitive same-length cutting operation can resume by following Procedure 400E:

a) rear fastening device 416 is first loosened (although preferably not removed) from rear stop post 415 of slide rail 414 allowing rear slide notch 425 of slide plate 420 to disengage from said rear stop post 415;

b) in a direction indicated by double Arrow G, slide plate 420 and stop member 450, as a fixedly coupled assembly, is then slid to a front position thereby re-engaging front slide notch 425 of slide plate 420 with front stop post 415 of slide rail 414;

c) lastly, front fastening device 416 is securely tightened down upon front stop post 415 of slide rail 414 and slide notch 425 of slide plate 420 thereby again affixing the assembly in a front position.

Upon completion of the above procedure, the portable workpiece stopping device 400 is configured back into an obstructing position wherein, most importantly, stop plate 440, relative to the primary tool, returns to the same position as prior to interruption. The same-length cutting operation can then resume after incurring very little down-time or disruption.

Figure 8:
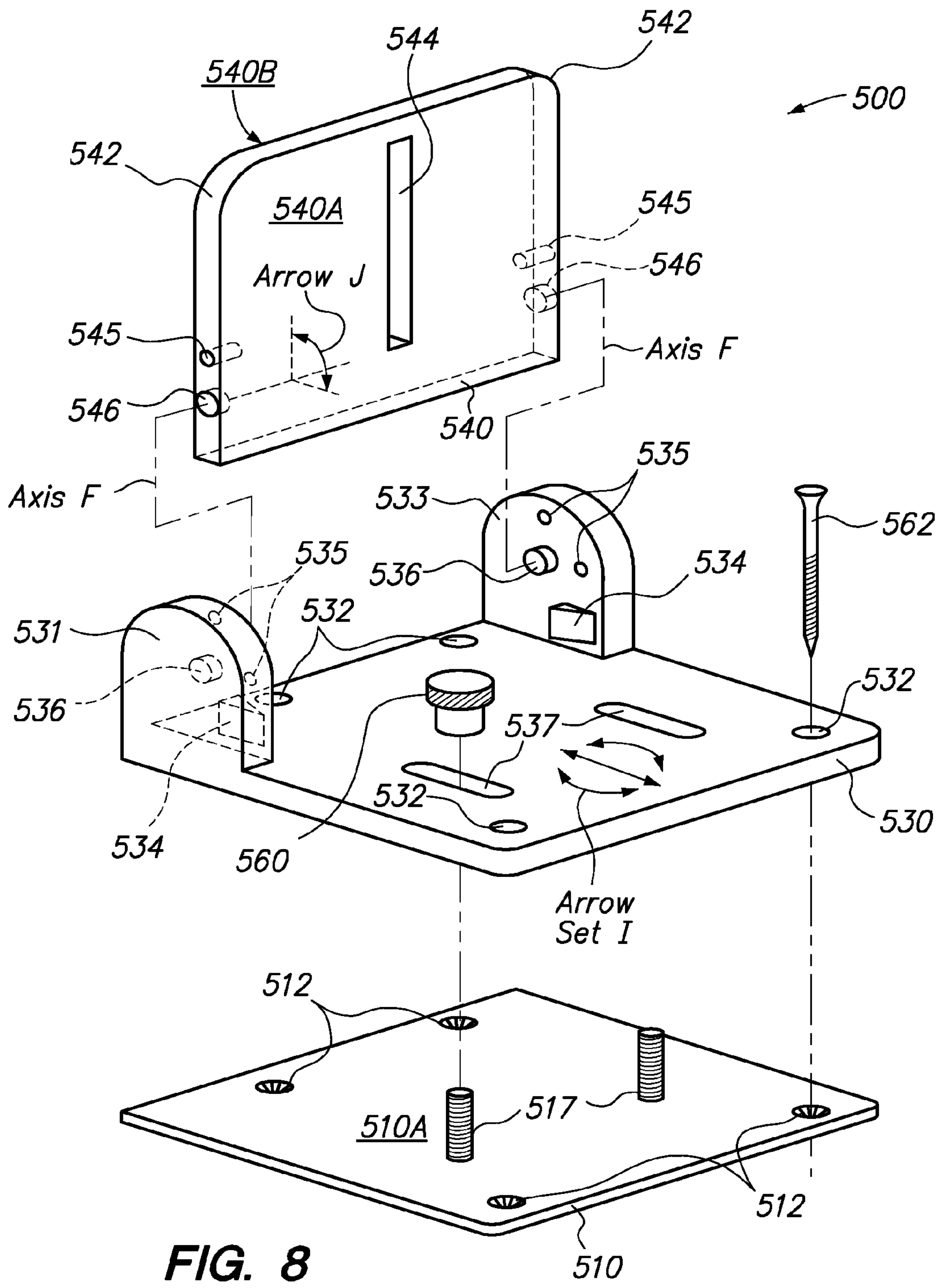
FIG. 8 is an exploded perspective view of another embodiment of a portable workpiece stopping device in accordance with the invention.

Referring now to FIG. 8, an exploded assembly view of the portable workpiece stopping device 500 in accordance with one embodiment of the invention is shown. The primary components being comprised of a base plate 510, an alignment plate 530, a stop plate 540, and a support shelf 570 (not shown). Each component is preferably fabricated of relatively strong and corrosion resistant materials such as stainless steel. As previously described however, with respect to the portable workpiece stopping device 100 embodiment, other materials may be used to fabricate the various components.

Base plate 510 is substantially square and extends in a plane substantially parallel to the work surface on which it is mounted (e.g., work surface 26, FIG. 1). The underside of base plate 510 also defines the mounting plane. Base plate 510 further comprises a plurality of fastener openings 512 spaced apart in two different directions relative to one another within the mounting plane (four fastener openings 512 are shown) for receiving mounting fasteners 562 (e.g., wood screws, commonly available on construction projects) to attach base plate 510 to the work surface. Fastener openings 512 are generally located near each corner and are sized to allow only the threaded and shaft portions of mounting fasteners 562 to pass through and to not allow the head portion of the fastener to pass through. Additionally, the underside of base plate 510, the mounting plane, engages the work surface when the device 500 is mounted.

Base plate 510 further comprises at least one post or stud 517 (two studs 517 are shown) protruding upwardly from and perpendicular to a top surface 510A and is adapted to receive a fastening device 560 such as a wing nut, thumb knob, clamp, or the like. Studs 517 are of adequate height and extend proud of alignment plate 530 (described below). Studs 517 are affixed to base plate 510 by, for example, a threading arrangement, a weld, a pressed mechanical bond, an integrating molding process, or by any other acceptable method.

Referring again to FIG. 8, alignment plate 530 is substantially square and comprises a plurality of openings, a left axle post 531, a right axle post 533, and considerations herein further described:

Alignment plate 530 extends in a plane substantially parallel to base plate 510, and has a length and width substantially similar to base plate 510; although in another embodiment alignment plate 530 may have dimensions dissimilar to base plate 510. Alignment plate 530 further comprises a plurality of fastener openings 532 (four fastener openings 532 are shown) also generally located near each corner of alignment plate 530 and each concentrically aligned with its respective fastener opening 512 of base plate 510 when the portable workpiece stopping device 500 is configured in an obstructing position and alignment plate 530 is center-located (described below). Fastener openings 532 of alignment plate 530 are of such a diameter as to allow the entire mounting fastener 562 to pass completely though thereby allowing alignment plate 530 to be completely unencumbered by mounting fasteners 562.

Alignment plate 530 further comprises at least one elongated opening 537 (two elongated openings 537 are shown)

disposed to receive studs 517 of base plate 510 as studs 517 extend upwardly and proud of alignment plate 530. Elongated openings 537 are elongated in a direction of the longitudinal orientation extending between the device 500 and the primary tool, and further allow alignment plate 530 to be moved horizontally both laterally in a direction of the longitudinal orientation and rotationally about an approximate vertical axis, as indicated by Arrow Set I, relative to base plate 510; both movement capabilities are limited by the length and width of elongated openings 537 relative to studs 517 of base plate 510. When in use, fastening devices 560 cooperate with the aforementioned openings and studs to accommodate fine longitudinal and rotational adjustments of alignment plate 530 and stop plate 540, relative to a primary tool.

Left axle post 531 and a right axle post 533 of alignment plate 530 are set apart one from the other on opposing edges of alignment plate 530 and are temporarily removable from alignment plate 530 to accommodate assembly. Each axle post 531 and 533 comprises an axle/shear pin 536, a rotation stop 534, and two ball detents 535, herein further described:

Axle/shear pin 536 of left axle post 531 and axle/shear pin 536 of right axle post 533 face one another and are both concentrically aligned about Axis F. Both axle/shear pins 536 cooperate to allow axle receiving holes 546 of stop plate 540 (described below) to be rotatably coupled between the two and provide an intentional, "sacrificial", point of weakness, with respect to the portable workpiece stopping device 500 should the stop plate 540 (described below) be excessively impacted by a heavy workpiece during use, thereby preserving the remaining components from damage. Axis F and pins 536 define a horizontal rotation axis of stop plate 540 (described below) relative to alignment plate 530 and base plate 510; further, Axis F is perpendicular to the longitudinal orientation extending between the device 500 and the primary tool.

Rotation stops 534 of axle posts 531 and 533 are positioned on inside surfaces of said axle posts so as to restrict rotation of stop plate 540 beyond a substantially perpendicular position, relative to alignment plate 530, when being transitioned from a substantially parallel position, relative to alignment plate 530.

Ball detents 535, two per left axle post 531 and two per right axle post 533, are positioned on inside surfaces of said axle posts to cooperate with ball plungers 545 of stop plate 540 (described below) in order to temporarily arrange stop plate 540 in a substantially perpendicular or parallel position relative to alignment plate 530. More specifically, one pair of ball detents 545 (one ball detent 545 is located on an inside surface of left axle post 531 facing the other ball detent 545 which is located on an inside surface of right axle post 533) temporarily arranges stop plate 540 in a substantially perpendicular position, relative to alignment plate 530, and the other pair of ball detents 545 temporarily arrange stop plate 540 in a substantially parallel position, relative to alignment plate 530.

Referring again to FIG. 8, stop plate 540 is generally rectangular and comprises two axle receiving holes 546, two ball plungers 545, an elongated opening or slot 544, and considerations herein further described:

Axle receiving holes 546, one located on the left side of stop plate 540, the other located on the right side of stop plate 540, both concentrically aligned about Axis F, are disposed to receive left axle/shear pin 536 of left axle post 531 and right axle/shear pin 536 of right axle post 533, respectively.

Each ball plunger 545 of stop plate 540 is comprised of an internal biasing member, such as a compression spring, and a partially exposed projection ball. Ball plungers 545 are disposed one on each side of stop plate 540 and arranged so as to align and cooperatively contact, by means of the exposed projection ball, their respective ball detents 535 on axle posts 531 and 533 (described above). More specifically, when stop plate 540 is arranged in either a substantially perpendicular position or a substantially parallel position, relative to alignment plate 530, both projection balls of ball plungers 545, one on each side of stop plate 540, are pushed into their respective ball detents 535 on axle posts 531 and 533, thereby temporarily holding the relative perpendicular or parallel position. During the transition interval of stop plate 540 between perpendicular and parallel positions, the projection balls of ball plungers 545 are retracted slightly as the projection ball travels between ball detents 535 of axle posts 531 and 533. Additionally, the plungers 545 define a feature which is transitionable along a horizontal axis parallel to the axis of rotation, Axis F, between the stop plate 540 and the alignment plate 530. The plungers are transitionable between a locked position of the operating mechanism in which rotational movement between the obstructing position and the non-obstructing position is restricted and a moveable position of the operating mechanism in which rotational movement between the obstructing position and the non-obstructing position is permitted. The biasing mechanism of the plungers bias the plungers from the moveable position towards the locked position.

Slot 544 of stop plate 540 is disposed substantially perpendicular to alignment plate 530 when stop plate 540 is arranged in an obstructing position (described below) and passes entirely through the thickness of stop plate 540 to accommodate support shelf 570 (also described below).

Stop plate 540 further comprises top corners 542 that are rounded, chamfered, beveled, or otherwise configured to be substantially devoid of a sharp edge or point, thereby creating a safer work condition.

Stop plate 540, additionally, follows a substantially 90° travel path while being transitioned from a perpendicular/obstructing position to a parallel/non-obstructing position, and vice versa, relative to alignment plate 530, as indicated by double Arrow J.

The portable workpiece stopping device 500 can be positioned on either side of a primary tool, however, only abutment surface 540A of stop plate 540 can face the primary tool. Additionally, when configured in an obstructing position (described below), a top portion of stop plate 540 is disposed to extend somewhat above the primary tool's resting plane (e.g., resting plane 25 of miter saw 21, FIG. 1).

The portable workpiece stopping device 200 also comprises a support shelf (not shown) which is substantially the same, for all intents and purposes, as support shelf 170 previously described in the portable workpiece stopping device 100 embodiment except that the support shelf can only be attached to abutment surface 540A of stop plate 540.

In this embodiment, the mounting plane is defined by the underside of base plate 510, the intermediate body of the operating mechanism is defined by alignment plate 530, the stop member is defined by the stop plate 540; stop plate 540 also defines the stop face, the portion of the operating mechanism defining the prescribed direction of movement between obstructing and non-obstructing positions is defined by rotation Axis F, the action stop of the operating mechanism is defined by rotation stops 534, the adjustment mechanism is defined by studs 517 and elongated openings 537, and the clamping member of the adjustment mechanism is defined by fastening devices 560 on studs 517.

The portable workpiece stopping device 500 is located and configured in an obstructing position (described below), relative to a primary tool, in order to block, obstruct, or otherwise stop the abutment-end of a workpiece pressed against stop plate 540 so that any number of same-length cuts can be made. As required, the portable workpiece stopping device 500 can be quickly reconfigured into a non-obstructing position (also described below) to create an unfettered resting plane without affecting the essential positioning of alignment plate 530 and stop plate 540 relative to the primary tool (e.g., resting plane 25 of miter saw 21, FIG. 1). The following information describes practical field setup and use of the portable workpiece stopping device 500:

Firstly, prior to using the portable workpiece stopping device 500 on a construction project, referring to FIG. 8, the unit is assembled in an obstructing position and alignment plate 530 is center-located following Procedure 500A:

a) alignment plate 530 is first positioned atop base plate 510 such that studs 517 of base plate 510 extend proud of alignment plate 530;

b) fastening devices 560 are then fitted onto studs 517 of base plate 510 and tightened;

c) left axle post 531 is then connected to alignment plate 530;

d) axle receiving hole 546 on the left edge of stop plate 540 is now engaged with left axle/shear pin 536 of left axle post 531;

e) while connecting right axle post 533 to alignment plate 530, right axle/shear pin 536 of right axle post 533 is then engaged with axle receiving hole 546 on the right edge of stop plate 540;

f) right axle post 533 is then connected to alignment plate 530 thereby making stop plate 540 rotatable on axle/shear pins 536 of both axle posts 531 and 533;

g) stop plate 540 is then rotated to a substantially perpendicular/obstructing position, relative to alignment plate 530;

h) support shelf 570 is now slideably coupled to stop plate 540 by first inserting shelf key 573 into slot 544 of stop plate 540, by second inserting cooperating screw 576 through key hole 574 of support shelf 570, and by third connecting cooperating screw 576 to thumb knob 578;

i) after loosening fastening devices 560 alignment plate 530 is then center-located both laterally and rotationally, within available limits, as indicated by Arrow Set I, by moving alignment plate 530 as needed to locate all studs 517 to a mid-position along the length of slotted openings 537; as a result all fastener openings 532 and 512 of alignment plate 530 and base plate 510, respectively, are concentrically aligned;

j) lastly, to fixedly couple alignment plate 530 to base plate 510 fastening devices 560 are tightened down upon studs 517 of base plate 510.

Secondly, prior to using the portable workpiece stopping device 500 on a construction project, referring to FIG. 1, the unit is roughed into position on work surface 26 by following Procedure 500B:

a) workpiece length L is first determined from the particular construction task at hand, thereafter allowing repetitive same-length cuts be made to any number of workpieces;

b) relative to the primary tool, miter saw 21, the portable workpiece stopping device 500 is then placed on either side of said tool, as work station 20 requires, on work surface 26, with abutment surface 540A of stop plate 540 being positioned at approximately length L from saw blade 22 of miter saw 21; that is, a close but not precise measurement (e.g., +/−13 mm or ½") is made between cutting plane 23 of saw blade 22, and abutment surface 540A of stop plate 540, so as to position the unit within length adjustment range;

c) stop plate 540 is also positioned approximately perpendicular to the longitudinal orientation of workpiece 10 so as to position the unit within rotational adjustment range;

d) lastly, base plate 510 is attached to work surface 26 by inserting one or more mounting fasteners 562 through fastener openings 532 of alignment plate 530 into fastener openings 512 of base plate 510 screwing the plate 510 to work surface 26.

Thirdly, to use the portable workpiece stopping device 500 on a construction project, referring to FIG. 1, stop plate 550 is precisely adjusted using a solitary workpiece 10 by following Procedure 500C:

a) the height of resting plane 25 of miter saw 21 is first measured relative to work surface 26;

b) the corresponding height of support shelf 570, also relative to work surface 26, is then arranged in position by loosening thumb knob 578 from cooperating screw 576 of support shelf 570, and sliding shelf key 573, as required, within slot 544 of stop plate 540, and retightening thumb knob 578 against cooperating screw 576;

c) fastening devices 560 are then loosened from studs 517 of base plate 510, subsequently loosening alignment plate 530 and coupled stop plate 540;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to the length L where a length-mark is inscribed (typically with a pencil);

f) with the abutment-end of workpiece 10 resting on support shelf 570 of stop plate 460, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 540A of stop plate 540 is then brought into full and complete contact with the abutment-end of workpiece 10; thereby performing required lateral and rotational adjustments of alignment plate 530 and stop plate 540 to accommodate specific workpiece 10 abutment-end length and squareness requirements, respectively;

i) alignment plate 530 is now fixed into position by tightening all fastening devices 560 down upon studs 517 base plate 510;

j) lastly, the partial-depth cut on workpiece 10 is cut entirely through by blade 22 of miter saw 21, afterwhich length L of workpiece 10 is verified.

Upon completion of the above procedure, the portable workpiece stopping device 500 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 500 is quickly reconfigured into a non-obstructing position by following Procedure 500D:

- a) fastening devices 560 are first verified to be tightly secured upon studs 517 of base plate 510 thereby ensuring that alignment plate 530 and base plate 510 are a fixedly coupled assembly;
- b) lastly, relative to alignment plate 530, stop plate 540 is transitioned out of a perpendicular/obstructing position by pushing on surface 540B thereby rotating stop plate 540 into a parallel/non-obstructing position; the pushing force must be sufficient to overcome the forces of the internal biasing members pushing on the balls of ball plungers 545 of stop plate 640, which, prior to rotation, are resting in the perpendicular-position ball detents 535 of axle posts 531 and 533.

Upon completion of the above procedure, the portable workpiece stopping device 500 is configured in a non-obstructing position thereby creating an unfettered work zone and resting plane 25 relative to miter saw 21, without affecting the essential positioning of alignment plate 530 and stop plate 540, also relative to miter saw 21.

Fifthly, the repetitive same-length cutting operation can resume by following Procedure 500E:

- a) relative to alignment plate 530, stop plate 540 is transitioned out of a parallel position by lifting on surface 540A until stop plate 540 is rotated back to a perpendicular position; the lifting force must be sufficient to overcome the forces of the internal biasing members pushing on the balls of ball plungers 545 of stop plate 640, which, prior to rotation, are resting in the parallel-position ball detents 535 of axle posts 531 and 533.

Upon completion of the above procedure, the portable workpiece stopping device 500 is configured back into an obstructing position wherein, most importantly, stop plate 540, relative to the primary tool, returns to the same position as prior to interruption. The same-length cutting operation can then resume after incurring very little down-time or disruption.

Figure 9:
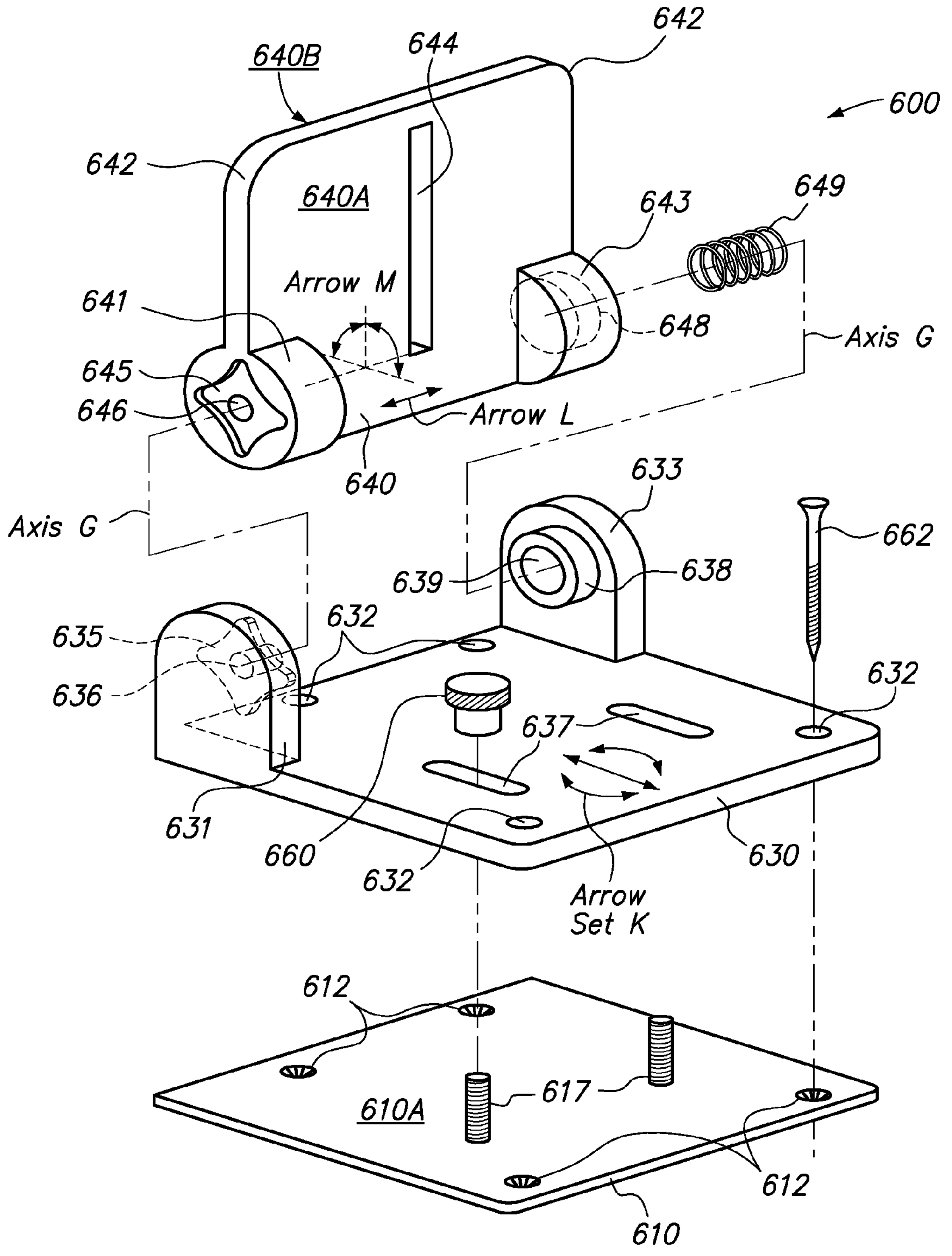
FIG. 9 is an exploded perspective view of another embodiment of a portable workpiece stopping device in accordance with the invention.

Referring now to FIG. 9, an exploded assembly view of the portable workpiece stopping device 600 in accordance with one embodiment of the invention is shown. The primary components being comprised of a base plate 610, an alignment plate 630, a stop plate 640, and a support shelf 670 (not shown). Each component is preferably fabricated of relatively strong and corrosion resistant materials such as stainless steel. As previously described however, with respect to the portable workpiece stopping device 100 embodiment, other materials may be used to fabricate the various components.

Base plate 610 is substantially square and extends in a plane substantially parallel to the work surface on which it is mounted (e.g., work surface 26, FIG. 1). The underside of base plate 610 also defines the mounting plane. Base plate 610 further comprises a plurality of fastener openings 612 spaced apart in two different directions relative to one another within the mounting plane (four fastener openings 612 are shown) for receiving mounting fasteners 662 (e.g., wood screws, commonly available on construction projects) to attach base plate 610 to the work surface. Fastener openings 612 are generally located near each corner and are sized to allow only the threaded and shaft portions of mounting fasteners 662 to pass through and to not allow the head portion of the fastener to pass through. Additionally, the underside of base plate 610, the mounting plane, engages the work surface when the device 600 is mounted.

Base plate 610 further comprises at least one post or stud 617 (two studs 617 are shown) protruding upwardly from and perpendicular to a top surface 610A and is adapted to receive a fastening device 660 such as a wing nut, thumb knob, clamp, or the like. Studs 617 are of adequate height and extend proud of alignment plate 630 (described below). Studs 617 are affixed to base plate 610 by, for example, a threading arrangement, a weld, a pressed mechanical bond, an integrating molding process, or by any other acceptable method.

Referring again to FIG. 9, alignment plate 630 is substantially square and comprises a plurality of openings, a left axle post 631, a right axle post 633, and considerations herein further described:

Alignment plate 630 extends in a plane substantially parallel to base plate 610, and has a length and width substantially similar to base plate 610; although in another embodiment alignment plate 630 may have dimensions dissimilar to base plate 610. Alignment plate 630 further comprises a plurality of fastener openings 632 (four fastener openings 632 are shown) also generally located near each corner of alignment plate 630 and each concentrically aligned with its respective fastener opening 612 of base plate 610 when the portable workpiece stopping device 600 is configured in an obstructing position and alignment plate 630 is center-located (described below). Fastener openings 632 of alignment plate 630 are of such a diameter as to allow the entire mounting fastener 662 to pass completely though thereby allowing alignment plate 630 to be completely unencumbered by mounting fasteners 662.

Alignment plate 630 further comprises at least one elongated opening 637 (two elongated openings 637 are shown) disposed to receive studs 617 of base plate 610 as studs 617 extend upwardly and proud of alignment plate 630. Elongated openings 637 further allow alignment plate 630 to be moved both laterally and rotationally, as indicated by Arrow Set K, relative to base plate 610; both movement capabilities are limited by the length and width of elongated openings 637 relative to studs 617 of base plate 610. When in use, fastening devices 660 cooperate with the aforementioned openings and studs to accommodate fine lateral and rotational adjustments of alignment plate 630 and stop plate 640, relative to a primary tool.

Left axle post 631 and a right axle post 633, comprising features that allow stop plate 640 to rotatably couple between the two (described below), are set apart one from the other on opposing edges of alignment plate 630, are temporarily removable from alignment plate 630 to accommodate assembly, and are herein further described:

Left axle post 631 of alignment plate 630 comprises a protruding/male tapered key 635 and an axle pin 636 concentrically aligned about Axis G. Male tapered key 635 may be configured in a square shape, a star shape, or a clover shape, exactly or approximately, or in a combination of these shapes, and provides for 90° positive-position rotation capability at substantially perpendicular and parallel positions, relative to alignment plate 630.

Right axle post 633 of alignment plate 630 comprises an axle hub 638, also concentrically aligned about Axis G, within which is a pocket or hub recess 639 which accepts and cooperates with a biasing member 649, such as a compression spring.

Referring again to FIG. 9, stop plate 640 is generally rectangular and comprises a left axle block 641, a right axle block 643, an elongated opening or slot 644, and considerations herein further described:

Left axle block 641 of stop plate 640 comprises a substantially similarly configured recessed/female tapered key 645, also aligned about Axis G, which intermittently engages (described below) with male tapered key 635 of left axle post 631. Left axle block 641 also comprises an axle pin hole 646, also concentrically aligned about Axis G, which rotatably couples with axle pin 636 of left axle post 631 to continuously align left axle block 641 of stop plate 640 with axle pin 636 of left axle post 631.

Right axle block 643 of stop plate 640 comprises a hub receiving bore 648, also concentrically aligned about Axis G, which rotatably couples with axle hub 638 of right axle post 633. Additionally, hub receiving bore 648 accepts and cooperates with biasing member 649, such as a compression spring. Stop plate 640 is therefore supported for rotational movement relative to alignment plate 630 and base plate 610 about horizontal Axis G which is perpendicular to the longitudinal orientation extending between the device 600 and the primary tool.

Slot 644 of stop plate 640 is disposed substantially perpendicular to alignment plate 630 when stop plate 640 is arranged in an obstructing position (described below) and passes entirely through the thickness of stop plate 640 to accommodate support shelf 670 (also described below).

Stop plate 640 further comprises top corners 642 that are rounded, chamfered, beveled, or otherwise configured to be substantially devoid of a sharp edge or point, thereby creating a safer work condition.

Additionally, stop plate 640 relative to alignment plate 630, while being transitioned from a substantially perpendicular position to a substantially parallel position, or vice versa, can follow one of two substantially 90° travel paths, that is, to a substantially parallel position on either side of substantially perpendicular, as indicated by double Arrow J.

The portable workpiece stopping device 600 can be positioned on either side of a primary tool wherein either abutment surface 640A or 640B of stop plate 640 can face the primary tool. Additionally, when configured in an obstructing position (described below), a top portion of stop plate 640 is disposed to extend somewhat above the primary tool's resting plane (e.g., resting plane 25 of miter saw 21, FIG. 1).

When considering the assembly of stop plate 640 and alignment plate 630 configured in either a substantially perpendicular position or a substantially parallel position relative to each other, stop plate 640, containing axle blocks 641 and 643, is adapted to cooperatively slide bank-and-forth between axle posts 631 and 633 of alignment plate 630, as indicated by Arrow L. Further, this motion allows intermittent engagement of male tapered key 635 of left axle post 631 with female tapered key 645 of left axle block 641. Accordingly, when a biasing member 649 is inserted between hub receiving bore 648 of right axle block 643 of stop plate 640, and hub recess bore 639 of right axle post 633 of alignment plate 630, biasing member 649 is able to exert an engagement force on stop plate 640 thereby urging female tapered key 645 of axle block 641 of stop plate 640 to engage with male tapered key 635 of left axle post 631 of alignment plate 630. The engagement force can be overcome only when adequate pressure is applied to the edge of stop plate 640 opposite biasing member 649; the resulting force against biasing member 649 allows the keys 645 and 635 to disengage as long as the pressure is applied. In this manner stop plate 640 is transitionable along a horizontal axis parallel to the axis of rotational movement, Axis G, between stop plate 640 and alignment plate 630. Stop plate 640 is transitionable between a locked position of the operating mechanism in which rotational movement between the obstructing position and the non-obstructing position is restricted and a moveable position of the operating mechanism in which the rotational movement between the obstructing position and the non-obstructing position is permitted. The biasing member 649 biases stop plate 640 from the moveable position towards the locked position.

When further considering the stop plate 640/alignment plate 630 rotatably coupled assembly, male tapered key 635 of axle post 631 and female tapered key 645 of axle block 641 are configured to allow orientation of stop plate 640 in a position that is either substantially perpendicular or substantially parallel to alignment plate 630, the travel path of stop plate 640 being indicated by double Arrow M.

Additionally, cooperation of the various components, especially biasing member 649, male tapered key 635 of left axle post 631, and female tapered key 645 of axle block 641, allows for rapid transition between substantially perpendicular and substantially parallel configurations when a burst of simultaneous linear and rotational pressure is exerted on the edge of stop plate 640 (the edge opposite biasing member 649) against biasing member 649, to temporarily disengage the keys followed by a quick rotation then release of stop plate 640.

Further, as a result of the configuration between tapered keys 635 and 645, and between right axle post 633, biasing member 649, and right axle block 643, when stop plate 640 is arranged in an obstructing position (described below) relative to alignment plate 630, and if the relevant components of the portable workpiece stopping device 600 are of an adequately strong material (e.g., stainless steel), a sudden impact on either abutment surface 640A or 640B of stop plate 640, by a heavy workpiece, will cause stop plate 640 to abruptly transition from a substantially perpendicular/obstructing position to a substantially parallel/non-obstructing position (also described below), relative to alignment plate 630, without adversely affecting any components. This "break-away" feature occurs when stop plate 640 is impacted with adequate force to overcome the engagement pressure resulting from biasing member 649, thereby causing the engaged tapered surfaces of keys 635 and 645 to slide upon one another until the keys are disengaged, thereby allowing free rotation of stop plate 640 until the keys are re-engaged as a result of the continuous pressure exerted by biasing member 649, after a substantially 90° rotation.

In this embodiment, the mounting plane is defined by the underside of base plate 610, the intermediate body of the operating mechanism is defined by alignment plate 630, the stop member is defined by stop plate 640; stop plate 640 also defines the stop face, the portion of the operating mechanism defining the prescribed direction of movement between obstructing and non-obstructing positions is defined by rotation Axis G, the action stop of the operating mechanism is defined by the interlocking aspect of the tapered keys 635 and 645, the adjustment mechanism is defined by studs 617 and elongated openings 637, and the clamping member of the adjustment mechanism is defined by fastening devices 660 on studs 617.

The portable workpiece stopping device 600 also comprises a support shelf (not shown) which is exactly the same, for all intents and purposes, as support shelf 170 previously described in the portable workpiece stopping device 100 embodiment.

The portable workpiece stopping device 600 is located and configured in an obstructing position (described below), relative to a primary tool, in order to block, obstruct, or otherwise stop the abutment-end of a workpiece pressed against stop plate 640 so that any number of same-length cuts can be made. As required, the portable workpiece stopping device 600 can be quickly reconfigured into a non-obstructing position (also described below) to create an unfettered resting plane without affecting the essential positioning of alignment plate 630 and stop plate 640 relative to the primary tool (e.g., resting plane 25 of miter saw 21, FIG. 1). The following information describes practical field setup and use of the portable workpiece stopping device 600:

Firstly, prior to using the portable workpiece stopping device 600 on a construction project, referring to FIG. 9, the unit is assembled in an obstructing position and alignment plate 630 is center-located following Procedure 600A:

a) alignment plate 630 is first positioned atop base plate 610 such that studs 617 of base plate 610 extend proud of alignment plate 630;

b) fastening devices 660 are then fitted onto studs 617 of base plate 610 and tightened;

c) left axle post 631 is then connected to alignment plate 630;

d) while stop plate 640 is arranged in a substantially perpendicular/obstructing position, relative to alignment plate 630, left axle block 641 of stop plate 640 is now engaged with left axle post 631 of alignment plate 630;

e) simultaneously, right axle post 633 is connected to alignment plate 630 as hub recess 639 of right axle post 633 and hub bore 648 of right axle block 643 both receive biasing member 649; the result is a stop plate 640 configured in a substantially perpendicular position, relative to alignment plate 630, with a pressure force therein engaging female tapered key 645 of left axle block 641 with male tapered key 635 of left axle post 631;

f) support shelf 670 is now slideably coupled to stop plate 640 by first inserting shelf key 673 into slot 644 of stop plate 640, by second inserting cooperating screw 676 through key hole 674 of support shelf 670, and by third connecting cooperating screw 676 to thumb knob 678;

g) after loosening fastening devices 660 alignment plate 630 is then center-located both laterally and rotationally, within available limits, as indicated by Arrow Set K, by moving alignment plate 630 as needed to locate all studs 617 to a mid-position along the length of slotted openings 637 of alignment plate 330; as a result all fastener openings 632 and 612 of alignment plate 630 and base plate 610, respectively, are concentrically aligned;

h) lastly, to fixedly couple alignment plate 630 to base plate 610 fastening devices 660 are tightened down upon studs 617 of base plate 610.

Secondly, prior to using the portable workpiece stopping device 600 on a construction project, referring to FIG. 1, the unit is roughed into position on work surface 26 by following Procedure 600B:

a) workpiece length L is first determined from the particular construction task at hand, thereafter allowing repetitive same-length cuts be made to any number of workpieces;

b) relative to the primary tool, miter saw 21, the portable workpiece stopping device 600 is then placed on either side of said tool, as work station 20 requires, on work surface 26, with stop plate 640 being positioned at approximately length L from saw blade 22 of miter saw 21; that is, a close but not precise measurement (e.g., +/−13 mm or ½") is made between cutting plane 23 of saw blade 22, and abutment surface 640A or 640B of stop plate 640 (whichever is facing miter saw 21), so as to position the unit within length adjustment range;

c) stop plate 640 is also positioned approximately perpendicular to the longitudinal orientation of workpiece 10 so as to position the unit within rotational adjustment range;

d) lastly, base plate 610 is attached to work surface 26 by inserting one or more mounting fasteners 662 through fastener openings 632 of alignment plate 630 into fastener openings 612 of base plate 610 screwing the plate 610 to work surface 26.

Thirdly, to use the portable workpiece stopping device 600 on a construction project, referring to FIG. 1, stop plate 650 is precisely adjusted using a solitary workpiece 10 by following Procedure 600C:

a) the height of resting plane 25 of miter saw 21 is first measured relative to work surface 26;

b) the corresponding height of support shelf 670, also relative to work surface 26, is then arranged in position by loosening thumb knob 678 from cooperating screw 676 of support shelf 670, and sliding shelf key 673, as required, within slot 644 of stop plate 640, and retightening thumb knob 678 against cooperating screw 676;

c) fastening devices 660 are then loosened from studs 617 of base plate 610, subsequently loosening alignment plate 630 and coupled stop plate 640;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to the length L where a length-mark is inscribed (typically with a pencil);

f) with the abutment-end of workpiece 10 resting on support shelf 670 of stop plate 460, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 640A or 640B (whichever is facing the primary tool, miter saw 21) of stop plate 640 is then brought into full and complete contact with the abutment-end of workpiece 10; thereby performing required lateral and rotational adjustments of alignment plate 630 and stop plate 640 to accommodate specific workpiece 10 abutment-end length and squareness requirements, respectively;

i) alignment plate 630 is now fixed into position by tightening all fastening devices 660 down upon studs 617 base plate 610;

j) lastly, the partial-depth cut on workpiece 10 is cut entirely through by blade 22 of miter saw 21, afterwhich length L of workpiece 10 is verified.

Upon completion of the above procedure, the portable workpiece stopping device 600 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 600 is quickly reconfigured into a non-obstructing position by following Procedure 600D:

a) fastening devices 660 are first verified to be tightly secured upon studs 617 of base plate 610 thereby ensuring that alignment plate 630 and base plate 610 are a fixedly coupled assembly;

b) a simultaneous lateral and rotational force (either clockwise or counter-clockwise) is then exerted on the appropriate edge of stop plate 640 in a direction toward biasing member 649, which temporarily disengages female tapered key 645 from male tapered key 635 of axle block 641 and axle post 631, respectively, thereby causing stop plate 640 to be reoriented from a perpendicular position to a parallel position, relative to alignment plate 630;

c) lastly, removing said edge pressure from stop plate 640 allows biasing member 649 to re-engage female tapered key 645 into male tapered key 635 of axle block 641 and axle post 631, respectively.

Upon completion of the above procedure, the portable workpiece stopping device 600 is configured in a non-obstructing position thereby creating an unfettered work zone and resting plane 25 relative to miter saw 21, without affecting the essential positioning of alignment plate 630 and stop plate 640, also relative to miter saw 21.

Fifthly, the repetitive same-length cutting operation can resume by following Procedure 600E:

a) a simultaneous lateral and rotational (clockwise or counter-clockwise, as required) force is first exerted on the appropriate edge of stop plate 640 in a direction toward biasing member 649, which again temporarily disengages female tapered key 645 from male tapered key 635 of axle block 641 and axle post 631, respectively, thereby causing stop plate 640 to be reoriented from a parallel position to a perpendicular position, relative to alignment plate 630;

b) lastly, removing said edge pressure from stop plate 640 allows biasing member 649 to re-engage female tapered key 645 into male tapered key 635 of axle block 641 and axle post 631, respectively.

Upon completion of the above procedure, the portable workpiece stopping device 600 is configured back into an obstructing position wherein, most importantly, stop plate 640, relative to the primary tool, returns to the same position as prior to interruption. The same-length cutting operation can then resume after incurring very little down-time or disruption.

Figure 10:
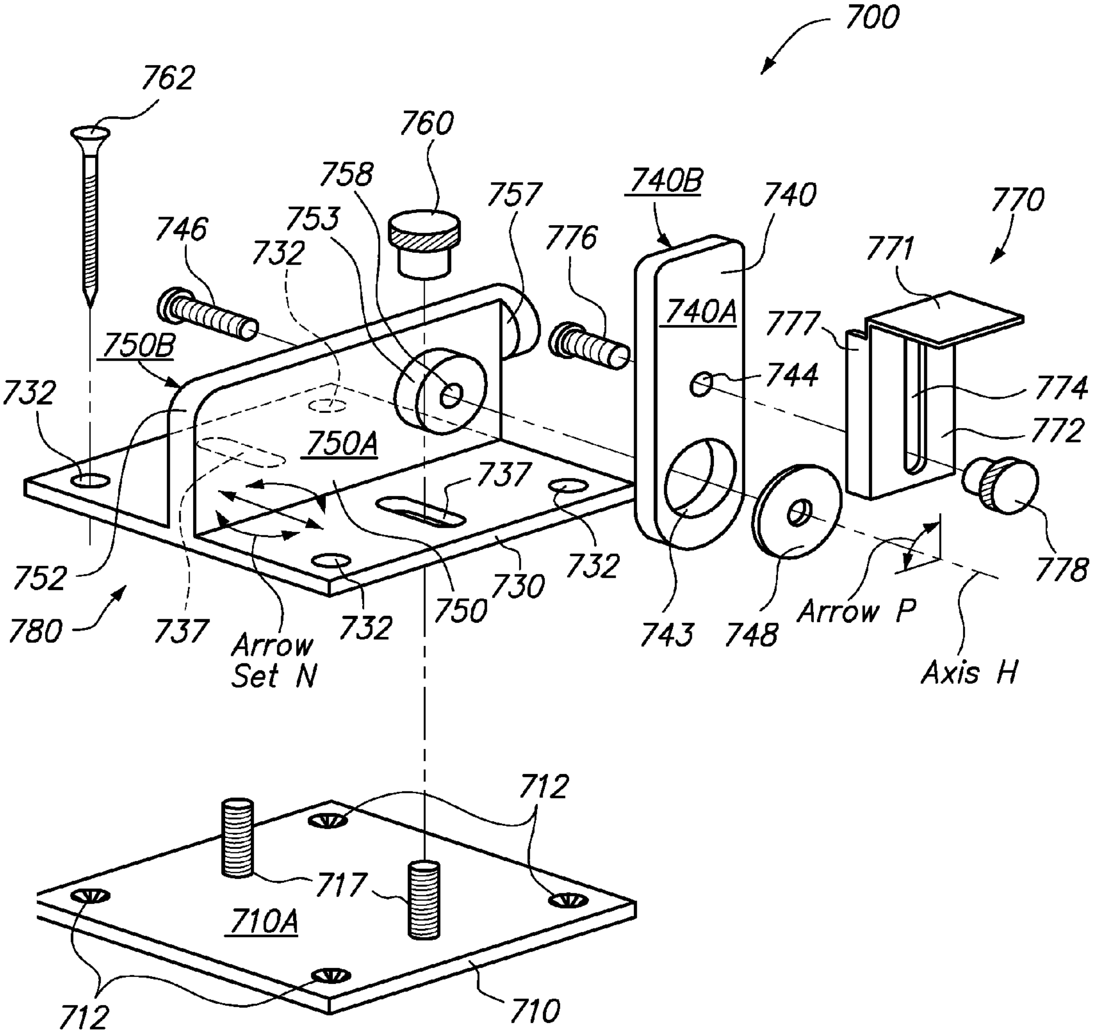
FIG. 10 is an exploded perspective view of another embodiment of a portable workpiece stopping device in accordance with the invention.

Referring now to FIG. 10, an exploded assembly view of the portable workpiece stopping device 700 in accordance with one embodiment of the invention is shown. The primary components being comprised of a base plate 710, a swing member 780 (further comprising an alignment plate 730 and a swing plate 750), a stop plate 740, and a support shelf, shown generally at 770. Each component is preferably fabricated of relatively strong and corrosion resistant materials such as stainless steel. As previously described however, with respect to the portable workpiece stopping device 100 embodiment, other materials may be used to fabricate the various components.

Base plate 710 is substantially square and extends in a plane substantially parallel to the work surface on which it is mounted (e.g., work surface 26, FIG. 1). The underside of base plate 710 also defines the mounting plane. Base plate 710 further comprises a plurality of fastener openings 712 spaced apart in two different directions relative to one another within the mounting plane (four fastener openings 712 are shown) for receiving mounting fasteners 762 (e.g., wood screws, commonly available on construction projects) to attach base plate 710 to the work surface. Fastener openings 712 are generally located near each corner and are sized to allow only the threaded and shaft portions of mounting fasteners 762 to pass through and to not allow the head portion of the fastener to pass through. Additionally, the underside of base plate 710, the mounting plane, engages the work surface when the device 700 is mounted.

Base plate 710 further comprises at least one post or stud 717 (two studs 717 are shown) protruding upwardly from and perpendicular to a top surface 710A and is adapted to receive a fastening device 760 such as a wing nut, thumb knob, clamp, or the like. Studs 717 are of adequate height and extend proud of alignment plate 730 (described below). Studs 717 are affixed to base plate 710 by, for example, a threading arrangement, a weld, a pressed mechanical bond, an integrating molding process, or by any other acceptable method.

Referring again to FIG. 10, swing member 780 is comprised of an alignment plate 730, a swing plate 750, and considerations herein further described:

Alignment plate 730 is substantially square, extends in a plane substantially parallel to base plate 710, and has a length and width substantially similar to base plate 710, although in another embodiment the alignment plate 730 may have dimensions dissimilar to base plate 710. Alignment plate 730 further comprises a plurality of fastener openings 732 (four fastener openings 732 are shown) also generally located near each corner of alignment plate 730 and each concentrically aligned with its respective fastener opening 712 of base plate 710 when swing member 780 is center-located (described below). Fastener openings 732 of alignment plate 730 are of such a diameter as to allow the entire mounting fastener 762 to pass completely though thereby allowing alignment plate 730 to be completely unencumbered by mounting fasteners 762.

Alignment plate 730 further comprises at least one elongated opening 737 (two elongated openings 737 are shown) disposed to receive studs 717 of base plate 710 as studs 717 extend upwardly and proud of alignment plate 730. Elongated openings 737 are elongated in a direction of the longitudinal orientation extending between the device 700 and the primary tool, and further allow alignment plate 730 to be moved horizontally both laterally in a direction of the longitudinal orientation and rotationally about an approximate vertical axis, as indicated by Arrow Set N, relative to base plate 710; both movement capabilities are limited by the length and width of elongated openings 737 relative to studs 717 of base plate 710. When in use, fastening devices 760 cooperate with the aforementioned openings and studs to accommodate fine lateral and rotational adjustments of swing member 780 (i.e., alignment plate 730 and swing plate 750) and stop plate 740, relative to a primary tool.

Swing plate 750 of swing member 780 is elongated, substantially rectangular and comprised of a swing post 753, a swing stop 757, and considerations herein further described:

Swing plate 750 of swing member 780 extends in a similar length orientation but is substantially perpendicular to alignment plate 730. Swing plate 750 is substantially the same length as alignment plate 730 and fixedly coupled along the entire length of swing plate 750, although in another embodiment the swing plate 750 may have length dimensions dissimilar to alignment plate 730.

Swing plate 750 further comprises a circular protrusion or swing post 753 located at one end of swing plate 750 on surface 750A. Swing post 753 is concentrically aligned about Axis H, protrudes somewhat proud and substantially perpendicular to surface 750A, and therein comprises a smooth-walled post hole 758, also concentrically aligned about Axis H. Further, post hole 758 passes through the full thicknesses of swing post 753 and swing plate 750. Additionally, a distil end of swing post 753, when rotatably coupled with swing bore 743 of stop plate 740 (described below), is disposed to accommodate a coupling component or retaining washer/nut 748, while not extending proud of surface 740A of stop plate 740.

Swing plate 750 further comprises a rotation stop 757 located at one end of swing plate 750 to restrict the swing range of stop plate 740 (described below). Further, when stop plate 740 is coupled with swing plate 750, rotation stop 757 restricts the rotation of stop plate 740 to a position that is substantially perpendicular relative to alignment plate 730.

Swing plate 750 further comprises top corners 752 that are rounded, chamfered, beveled, or otherwise configured to be substantially devoid of a sharp edge or point, thereby creating a safer work condition.

The alignment plate 730/swing plate 750 configuration may be T-shaped or L-shaped and any known method may be used to connect the components either permanently or temporarily, or the configuration may be fabricated as one piece.

Referring again to FIG. 10, stop plate 740 is elongated, generally rectangular, although half-circular at one end to accommodate a smooth rotation of stop plate 740 (described below) relative to alignment plate 730, and comprises a swing bore 743, a stud hole 744, and considerations herein further described:

Stop plate 740 comprises a swing bore 743 concentrically aligned about Axis H and slightly larger in diameter than swing post 753 of swing plate 750. Further, swing bore 743 is adapted to receive swing post 753, wherein retaining washer/nut 748 and coupling bolt 746, also concentrically aligned about Axis H, cooperate to rotatably couple the assembly. Additionally, stop plate 740 is rotational about horizontal Axis H relative to swing plate 750, alignment plate 760, and base plate 710 in which the horizontal Axis H is parallel to the longitudinal orientation extending between device 700 and the primary tool.

Stop plate 740 further comprises a stud hole 744 which passes through the full thicknesses and is located somewhat near the center of stop plate 740. Further, stud hole 744 accommodates cooperating screw 776 to adjustably couple support shelf 770 (described below) to stop plate 740.

Additionally, as indicated by double Arrow P, relative to alignment plate 730, stop plate 740 can be rotated about Axis H to a substantially perpendicular position, wherein stop plate 740 contacts rotation stop 757, or to a substantially parallel position, wherein stop plate 740 rests alongside swing plate 750. Further, stop plate 740 is held at a given rotational position by friction created by the amount of torque force applied between coupling bolt 746 and retaining washer/nut 748. And when assembled the outer surface of retaining washer/nut 748 rests flush with surface 740A to allow support shelf 770 (described below) to slide unobstructed over retaining washer/nut 748.

The portable workpiece stopping device 700 can be positioned on either side of a primary tool, however, only abutment surface 740A of stop plate 740 can face the primary tool. Additionally, when configured in an obstructing position (described below), a top portion of stop plate 740 is disposed to extend somewhat above the primary tool's resting plane (e.g., resting plane 25 of miter saw 21, FIG. 1).

Support shelf 770 comprises a protruding platform 771, a slide leg 772 which comprises an adjustment slot 774 and alignment tabs 777, a cooperating screw 779, and a thumb knob 778. Platform 771 is disposed substantially perpendicular to stop plate 740 while slide leg 772 is disposed substantially parallel to stop plate 740. Support shelf 770 is slideably coupled with stop plate 740 by means of a cooperating screw 776 inserted through stud hole 766 of stop plate 740, then through adjustment slot 774 of support shelf 770, and connecting it to thumb knob 778. This, or by any other acceptable securing method, allows selective height adjustment of support shelf 770 relative to a resting plane (e.g. resting plane 25, FIG. 1). Support shelf 770 is intended to carry the abutment-end of a workpiece (i.e., the end abutted or pressed against stop plate 740). Additionally, alignment tabs 777 which protrude from each side of slide leg 772 cooperate with stop plate 740 to adjustably guide support shelf 770 in parallel alignment with stop plate 740, thus preventing support shelf 770 from rotating under the weight of the workpiece.

In this embodiment, the mounting plane is defined by the underside of base plate 710, the intermediate body of the operating mechanism is defined by the interconnected components of the alignment plate 730 and swing plate 750, the stop member is defined by stop plate 740, the portion of the operating mechanism defining the prescribed direction of movement between obstructing and non-obstructing positions is defined by the rotation Axis H, the action stop of the operating mechanism is defined by rotation stop 757, the clamping member of the operating mechanism is defined by the screw 746, the adjustment mechanism is defined by studs 717 and elongated openings 737, and the clamping member of the adjustment mechanism is defined by fastening devices 760 on studs 717.

The portable workpiece stopping device 700 is located and configured in an obstructing position (described below), relative to a primary tool, in order to block, obstruct, or otherwise stop the abutment-end of a workpiece pressed against stop plate 640 so that any number of same-length cuts can be made. As required, the portable workpiece stopping device 700 can be quickly reconfigured into a non-obstructing position (also described below) to create an unfettered resting plane without affecting the essential positioning of alignment plate 730 and stop plate 740 relative to the primary tool (e.g., resting plane 25 of miter saw 21, FIG. 1). The following information describes practical field setup and use of the portable workpiece stopping device 700:

Firstly, prior to using the portable workpiece stopping device 700 on a construction project, referring to FIG. 10, the unit is assembled and alignment plate 730 is center-located following Procedure 700A:

a) swing member 780 is first positioned atop base plate 710 such that studs 717 of base plate 710 extend proud of alignment plate 730;

b) fastening devices 760 are then fitted onto studs 717 of base plate 710 although not tightened;

c) swing plate 750 and stop plate 740 now are rotatably coupled by concentrically engaging swing bore 743 of stop plate 740 about swing post 753 of swing plate 750;

d) retaining washer/nut 748 is then concentrically situated at the distal surface of swing post 753 of swing plate 750;

e) the assembly is then secured together with the insertion of coupling bolt 746 through post hole 758 of swing plate 750 and into retaining washer/nut 748;

f) stop plate 740 is then rotated to a substantially perpendicular/obstructing position, relative to alignment plate 130, as an edge of stop plate 740 contacts a surface of rotation stop 757 of swing plate 750;

g) support shelf 770 is now added to stop plate 740 by first inserting cooperating screw 776 through stud hole 744 of stop plate 740, by second aligning support shelf 770 with stop plate 740 and passing cooperating screw 776 through shelf slot 774 of support shelf 770, and by third connecting cooperating screw 776 to thumb knob 778;

h) while fastening devices 760 are in a loosened condition, swing member 780 is then center-located both laterally and rotationally, within available limits, as indicated by Arrow Set N, by moving alignment plate 730 as needed to locate all studs 717 of base plate 710 to a mid-position along the length of slotted openings 737 of alignment plate 730; as a result all fastener openings 732 and 712 of alignment plate 730 and base plate 710, respectively, are concentrically aligned;

i) lastly, to fixedly couple alignment plate 730 to base plate 710 fastening devices 760 are tightened down upon studs 717 of base plate 710.

Secondly, prior to using the portable workpiece stopping device 700 on a construction project, referring to FIG. 1, the unit is roughed into position on work surface 26 by following Procedure 700B:

a) workpiece length L is first determined from the particular construction task at hand, thereafter allowing repetitive same-length cuts be made to any number of workpieces;

b) relative to the primary tool, miter saw 21, the portable workpiece stopping device 700 is then placed on either side of said tool, as work station 20 requires, on work surface 26, with abutment surface 740A of stop plate 740 being positioned at approximately length L from saw blade 22 of miter saw 21; that is, a close but not precise measurement (e.g., +/−13 mm or ½") is made between cutting plane 23 of saw blade 22, and abutment surface 740A of stop plate 740, so as to position the unit within length adjustment range;

c) stop plate 740 is also positioned approximately perpendicular to the longitudinal orientation of workpiece 10 so as to position the unit within rotational adjustment range;

d) lastly, base plate 710 is attached to work surface 26 by inserting one or more mounting fasteners 762 through fastener openings 732 of alignment plate 730 into fastener openings 712 of base plate 710 screwing the plate 710 to work surface 26.

Thirdly, to use the portable workpiece stopping device 700 on a construction project, referring to FIG. 1, stop plate 770 is precisely adjusted using a solitary workpiece 10 by following Procedure 700C:

a) the height of resting plane 25 of miter saw 21 is first measured relative to work surface 26;

b) the corresponding height of support shelf 770, also relative to work surface 26, is then arranged in position by loosening thumb knob 778 from cooperating screw 776 and sliding support shelf 770 along slot 774, as required relative to cooperating screw 776 and stop plate 740, and retightening thumb knob 778 against cooperating screw 776;

c) fastening devices 760 are then loosened from studs 717 of base plate 710, subsequently loosening swing member 780;

d) to establish a true first surface, a square and exact cut is now made on the abutment-end of workpiece 10 (this assumes a square abutment-end cut is the desired condition for this end of all the workpieces with respect to this repetitive same-length cutting operation);

e) a measurement is then taken from the freshly cut abutment-end of workpiece 10 to length L along workpiece 10 where a length-mark is inscribed (typically with a pencil);

f) with the abutment-end of workpiece 10 resting on support shelf 770 of stop plate 460, the length-mark inscribed portion of workpiece 10 is now arranged on cutting platform 24 of miter saw 21 with the length-mark inscribed location precisely aligned to cutting plane 23 of blade 22;

g) while being safely held in position on cutting platform 24, a shallow or partial-depth cut is then made by blade 22 of miter saw 21 at the precise length-mark inscribed location; afterwhich the workpiece 10 is not moved but held firmly in position;

h) abutment surface 740A of stop plate 740 is then brought into full and complete contact with the abutment-end of workpiece 10; thereby performing required lateral and rotational adjustments of swing member 780 and stop plate 740 to accommodate specific workpiece 10 abutment-end length and squareness requirements, respectively;

i) alignment plate 730 is now fixed into position by tightening all fastening devices 760 down upon studs 717 base plate 710;

j) lastly, the partial-depth cut on workpiece 10 is cut entirely through by blade 22 of miter saw 21, afterwhich length L of workpiece 10 is verified.

Upon completion of the above procedure, the portable workpiece stopping device 700 is configured into a fixed, precisely adjusted, obstructing position. A repetitive same-length cutting operation can begin and continue as needed until the operation is complete or until the operation is interrupted.

Fourthly, to accommodate interruption during use, referring to FIG. 1, the portable workpiece stopping device 700 is quickly reconfigured into a non-obstructing position by following Procedure 700D:

a) fastening devices 780 are first verified to be tightly secured upon studs 717 of base plate 710 thereby ensuring that swing member 780 and base plate 710 are a fixedly coupled assembly;

b) lastly, relative to alignment plate 730, stop plate 740 is transitioned out of a perpendicular/obstructing position, by pushing on an edge of stop plate 740, the edge directly above rotation stop 757 of swing plate 750, to swing stop plate 740 into a parallel/non-obstructing position; the pushing force must be sufficient enough to overcome the friction created by the torque force between coupling bolt 746 and retaining washer/nut 748.

Upon completion of the above procedure, the portable workpiece stopping device 700 is configured in a non-obstructing position thereby creating an unfettered work zone and resting plane 25 relative to miter saw 21, without affecting the essential positioning of swing member 780 and stop plate 740, also relative to miter saw 21.

Fifthly, the repetitive same-length cutting operation can resume by following Procedure 700E:

a) relative to alignment plate 730, stop plate 740 is transitioned out of a parallel position by lifting on stop plate 740 until stop plate 740 is rotated back to a perpendicular position, wherein an edge of stop plate 740 is again contacting rotation stop 757 of swing plate 750; the lifting force must be sufficient enough to overcome the friction created by the torque force between coupling bolt 746 and retaining washer/nut 748.

Upon completion of the above procedure, the portable workpiece stopping device 700 is configured back into an obstructing position wherein, most importantly, stop plate 740, relative to the primary tool, returns to the same position as prior to interruption. The same-length cutting operation can then resume after incurring very little down-time or disruption.

The various embodiments disclosed herein have been presented for purposes of illustration and description but are expressly not intended to be exhaustive nor limiting in any respect. Many modifications and variations will be apparent to those of ordinary skill in the art. The embodiments shown in the figures and described accordingly were selected to best explain the principles and practical application of the invention as would pertain to all embodiments, and to enable others of ordinary skill in the art to consider and further develop these embodiments with modifications as may best suit a particular use. Accordingly, it is anticipated that the following claims cover all variations and modifications within the true scope of the invention.

What is claimed is:

1. A portable workpiece stopping device for mounting on a work surface at a prescribed distance in a longitudinal orientation from a primary tool, the device comprising:

a base member having an underside which defines a mounting plane and includes a plurality of fastener openings spaced apart one from the other in a direction of the mounting plane and arranged to receive fasteners therethrough for attaching the base member to the work surface;

a stop member defining a stop face thereon;

an operating mechanism including an intermediate body supporting the stop member on the base member such that the stop member is movable relative to the base member in a prescribed direction of the operating mechanism between an obstructing position, in which the stop face of the stop member is oriented perpendicular to said longitudinal orientation and is arranged to be positioned for engagement with an end of a workpiece, and a non-obstructing position in which access of the workpiece to the primary tool is substantially unobstructed by the stop member;

the operating mechanism including an action stop which prevents movement of the stop member relative to the base member beyond the obstructing position in the prescribed direction from the non-obstructing position to the obstructing position;

an adjustment mechanism coupling the intermediate body of the operating mechanism to one of the base member or the stop member;

the adjustment mechanism including a clamping member operable between a moveable position in which relative adjustment in a horizontal plane is permitted between the intermediate body of the operating mechanism and said one of the base member or the stop member and a clamped position in which the intermediate body is fixed to said one of the base member or the stop member;

the operating mechanism being operable to displace the stop member from the obstructing position to the non-obstructing position in the clamped position of the adjustment mechanism; and a support shelf defining an upper supporting surface arranged to support a workpiece thereon, the support shelf being configured relative to the base member for upward/downward sliding movement so as to be heightwise adjustable relative to the base member when in the obstructing position.

2. The device according to claim 1 wherein the relative adjustment between the intermediate body and said one of the base member or the stop member includes a direction other than said prescribed direction of the operating mechanism.

3. The device according to claim 1 wherein the relative adjustment between the intermediate body and said one of the base member or the stop member includes relative sliding movement in said longitudinal orientation.

4. The device according to claim 1 wherein the relative adjustment between the intermediate body and said one of the base member or the stop member includes relative rotational movement about a vertical axis.

5. The device according to claim 1 wherein the operating mechanism includes a clamping member arranged to selectively fix the stop member relative to the base member in the obstructing position.

6. The device according to claim 1 wherein the prescribed movement of the operating mechanism comprises a rotational movement about a horizontal axis which is parallel to said longitudinal orientation.

7. The device according to claim 1 wherein the prescribed movement of the operating mechanism comprises a rotational movement about a horizontal axis which is perpendicular to said longitudinal orientation.

8. The device according to claim 1 wherein the prescribed movement of the operating mechanism comprises a rotational movement about a vertical axis.

9. The device according to claim 1 wherein the prescribed movement of the operating mechanism comprises a horizontal linear sliding movement which is transverse to said longitudinal orientation.

10. The device according to claim 1 wherein the stop member is an upright plate member in the obstructing position and the support shelf is reversible mountable to protrude from either one of two opposing sides of the upright plate member.

11. The device according to claim 1 wherein the intermediate body is movable in the prescribed direction of the operating mechanism together with the stop member relative to the base member and wherein the adjustment mechanism permits relative adjustment between the stop member and the intermediate body in the moveable position of the clamping member.

12. The device according to claim 1 wherein the adjustment mechanism permits relative adjustment between the intermediate body and the base member in the moveable position of the clamping member and wherein the stop member is rotatable in the prescribed direction of the operating mechanism relative to both the intermediate body and the base member.

13. A portable workpiece stopping device for mounting on a work surface at a prescribed distance in a longitudinal orientation from a primary tool, the device comprising:

a base member having an underside which defines a mounting plane and includes a plurality of fastener openings spaced apart one from the other in a direction of the mounting plane and arranged to receive fasteners therethrough for attaching the base member to the work surface;

a stop member defining a stop face thereon;

an operating mechanism including an intermediate body supporting the stop member on the base member such that the stop member is movable with the intermediate body relative to the base member in a prescribed direction between an obstructing position in which the stop face of the stop member is oriented perpendicular to said longitudinal orientation and is arranged to be positioned for engagement with an end of a workpiece, and a non-obstructing position in which access of the workpiece to the primary tool is substantially unobstructed by the stop member;

the operating mechanism including an action stop which prevents movement of the stop member relative to the base member beyond the obstructing position in the prescribed direction from the non-obstructing position to the obstructing position;

an adjustment mechanism coupling the stop member to the intermediate body;

the adjustment mechanism including a clamping member operable between a moveable position in which relative adjustment in a horizontal plane is permitted between the stop member and the intermediate body and a clamped position in which the stop member is fixed relative to the intermediate body;

the operating mechanism being operable to displace the stop member and the intermediate body together from the obstructing position to the non-obstructing position in the clamped position of the adjustment mechanism; and a support shelf defining an upper supporting surface arranged to support a workpiece thereon, the support shelf being configured relative to the base member for upward/downward sliding movement so as to be height-wise adjustable relative to the base member when in the obstructing position.

14. The device according to claim 13 wherein the prescribed movement of the operating mechanism comprises a rotational movement about a horizontal axis which is parallel to said longitudinal orientation.

15. The device according to claim 13 wherein the prescribed movement of the operating mechanism comprises a rotational movement about a vertical axis which is perpendicular to said longitudinal orientation.

16. The device according to claim 13 wherein the prescribed movement of the operating mechanism comprises a horizontal linear sliding movement which is perpendicular to said longitudinal orientation.

17. A portable workpiece stopping device for mounting on a work surface at a prescribed distance in a longitudinal orientation from a primary tool, the device comprising:

a base member having an underside which defines a mounting plane and includes a plurality of fastener openings spaced apart one from the other in a direction of the mounting plane and arranged to receive fasteners therethrough for attaching the base member to the work surface;

a stop member defining a stop face thereon;

an operating mechanism including an intermediate body supported on the base member;

an adjustment mechanism coupling the intermediate body of the operating mechanism to the base member;

the adjustment mechanism including a clamping member operable between a moveable position in which relative adjustment in a horizontal plane is permitted between the intermediate body and the base member and a clamped position in which the intermediate body is fixed relative to the base member;

the operating mechanism supporting the stop member on the intermediate body such that the stop member is moveable relative to the intermediate body and the base member in a prescribed direction of the operating mechanism between an obstructing position in which the stop face of the stop member is oriented perpendicular to said longitudinal orientation and is arranged to be positioned for engagement with an end of a workpiece, and a non-obstructing position in which access of the workpiece to the primary tool is substantially unobstructed by the stop member;

the operating mechanism including an action stop which prevents movement of the stop member relative to the intermediate member beyond the obstructing position in the prescribed direction from the non-obstructing position to the obstructing position;

the operating mechanism being operable to displace the stop member from the obstructing position to the non-obstructing position in the clamped position of the adjustment mechanism;

a support shelf defining an upper supporting surface arranged to support a workpiece thereon, the support shelf being configured relative to the base member for upward/downward sliding movement so as to be height-wise adjustable relative to the base member when in the obstructing position.

18. The device according to claim 17 wherein the prescribed movement of the operating mechanism comprises a rotational movement about a horizontal axis which is perpendicular to said longitudinal orientation.

19. The device according to claim 18 wherein the stop member is transitionable along said horizontal axis between a locked position of the operating mechanism in which rotational movement between the obstructing position and the non-obstructing position is restricted and a moveable position of the operating mechanism in which rotational movement between the obstructing position and the non-obstructing position is permitted, and wherein there is provided a biasing mechanism which biases the stop member from the moveable position towards the locked position.

20. The device according to claim 17 wherein the prescribed movement of the operating mechanism comprises a rotational movement about a horizontal axis oriented parallel to said longitudinal orientation.

* * * * *